United States Patent [19]
Uemura et al.

[11] Patent Number: 5,530,651
[45] Date of Patent: Jun. 25, 1996

[54] RUNNING-SAFETY SYSTEM FOR AN AUTOMOTIVE VEHICLE

[75] Inventors: Hiroki Uemura; Tetsuro Butsuen; Tohru Yoshioka; Ayumu Doi; Naotsugu Masuda; Kenichi Okuda; Tadayuki Niibe; Yasunori Yamamoto; Satoshi Morioka; Tomohiko Adachi, all of Hiroshima-ken, Japan

[73] Assignee: Mazda Motor Corporation, Hiroshima-ken, Japan

[21] Appl. No.: 101,318

[22] Filed: Aug. 3, 1993

[30] Foreign Application Priority Data

Aug. 3, 1992 [JP] Japan .................................. 4-206812
Nov. 16, 1992 [JP] Japan .................................. 4-304294

[51] Int. Cl.$^6$ .................................................. G06F 165/00
[52] U.S. Cl. .............. 364/461; 364/424.05; 364/426.01; 340/435; 180/169
[58] Field of Search ............... 364/424.05, 426.01, 364/424.02, 461; 340/435, 436, 438; 180/167, 168, 169, 275; 342/70, 71, 72; 356/5, 28

[56] References Cited

U.S. PATENT DOCUMENTS

| | | | |
|---|---|---|---|
| 4,477,184 | 10/1984 | Endo | 356/141 |
| 4,673,937 | 6/1987 | Davis | 342/72 |
| 4,833,469 | 5/1989 | David | 340/901 |
| 4,950,075 | 8/1990 | Ichinose et al. | 356/141 |
| 4,967,860 | 11/1990 | Kremser | 180/169 |
| 5,251,680 | 10/1993 | Minezawa et al. | 180/170 |
| 5,285,207 | 2/1994 | Asbury et al. | 342/129 |
| 5,314,037 | 5/1994 | Shaw et al. | 180/169 |

FOREIGN PATENT DOCUMENTS

| | | |
|---|---|---|
| 51-7892 | 3/1976 | Japan . |
| 53-16230 | 2/1978 | Japan . |
| 53-33444 | 12/1979 | Japan . |
| 2-7156 | 1/1990 | Japan . |

*Primary Examiner*—Michael Zanelli
*Attorney, Agent, or Firm*—Fish & Richardson

[57] ABSTRACT

The vehicle is provided with a radar unit for detecting an obstacle existing ahead in the course of the running way along which the vehicle is running. When the radar unit detects a variation in its detectable region, such as a detectable distance or a detectable area range in left and right directions, from the detectable region to be detectable during ordinary running, a safety unit such as an alarm unit or an automatic brake unit is operated. A control logic for operating a collision-avoiding system for avoiding a collision with the obstacle existing ahead, such as an alarm unit or an automatic brake unit, is altered to a safe side on which safety in driving the vehicle is improved, when the detectable region is varied.

54 Claims, 14 Drawing Sheets

RUNNING-SAFETY SYSTEM FOR AN AUTOMOTIVE VEHICLE

BACKGROUND OF THE INVENTION

1. Field of the Invention

The present invention relates to a running-safety system for an automotive vehicle.

2. Description of the Related Art

Heretofore, there is known an automatic brake system as a running-safety system for an automotive vehicle. For example, Japanese Patent Unexamined Publication (kokai) No. 54(1979)-33,444 discloses an automatic brake system so adapted as to apply braking force to each of the wheels by operating an actuator when the risk of a collision of the body of the vehicle with an obstacle existing ahead in a running way along which the vehicle is running, if the vehicle would run as it does is decided to occur by continually monitoring, for example, a distance between the body of the vehicle and the obstacle with a radar unit. Such a running-safety system includes one of such a type as giving an alarm to a driver prior to an operation of an automatic brake system or of such a type as merely giving an alarm to a driver, in place of an operation of an automatic brake system.

As a system for detecting an obstacle existing ahead in a running way along which the vehicle is running, for example, Japanese Patent Unexamined Publication (kokai) No. 51(1976)-7,892 discloses a system that comprises a radar unit for detecting the obstacle, such as the body of a vehicle running ahead in the running way along which the vehicle is running by transmitting radar waves, such as ultrasonic waves, electrical waves, or the like, forward the obstacle existing ahead and receiving the reflected waves from the obstacle, a pivotal means for pivoting the radar unit horizontally, and a steered-angle detecting means for detecting a steered angle of the wheels of the vehicle. The system is so adapted as to detect the obstacle existing ahead in the running way along which the vehicle is running by directing the radar waves toward the direction in which the vehicle is running by pivoting the radar unit at a given angle with the pivotal means so as to comply with the steered angle of the vehicle detected by the steered-angle detecting means.

Further, systems have been developed which are of such a type as capable of monitoring obstacles existing ahead in a limited range of the running way of the vehicle by scanning a horizontal direction in which the vehicle is running at a relatively wide angle with a radar unit of a scanning type and picking up only the obstacles that can be predicted with a microcomputer from information gathered by scanning of the horizontal direction of the running way in which the vehicle is running, as existing ahead in the running way of the vehicle on the basis of the steered angle.

Such systems, however, suffer from the disadvantage that a detectable distance to be detectable by a detection means such as the radar unit is caused to be reduced to a remarkable extent due to weather situation such as fog, rain, or the like. Further, such a detectable distance in the running way of the vehicle to be detectable by the detection means is reduced due to a so-called blind curve of the running way in which the vehicle is running, which blocks the driver from seeing the curved side of the running way along which the vehicle is running.

As a means for competing with the drawbacks of the conventional systems in case of encountering with the difficulty in finding the obstacle existing ahead in the running way of the vehicle, Japanese Patent Unexamined Publication (kokai) No. 2(1990)-7,156 discloses a system that can stop the control itself for operating an action for avoiding a collision of the body of the vehicle with the obstacle. Patent Unexamined Publication (kokai) No. 53(1978)-16,230 discloses a system that can assume, for example, a distance between the body of the vehicle and an obstacle existing ahead in the running way of the vehicle on the basis of a detected value when the detectable distance is caused to become shorter than in driving the vehicle at usual conditions and then continue making a decision to determine if the body of the vehicle might strike against the obstacle.

However, the system as disclosed in Japanese Patent Unexamined Publication (kokai) No. 2(1990)-7,156 cannot demonstrate the function of a system for avoiding a collision with the obstacle existing ahead in the forward direction along the running way of the vehicle so that the system cannot be said as desirable in terms of ensuring safety in driving the vehicle. On the other hand, the system as disclosed in Japanese Patent Unexamined Publication (kokai) No. 53(1978)-16,230 suffers from the disadvantages that, although it is effective for a short period of time after the point when the detectable distance became shorter, the probability of causing an error in assumption becomes larger as the period of time elapses thereafter and that, if a new obstacle occurs is caused to appear ahead in the forward direction along the running way of the vehicle, the action for avoiding the new obstacle cannot be taken in an effective fashion.

Furthermore, when the vehicle is curved or cornered rapidly at a high speed or at a sharp angle, there may be the occasion that the running way of the vehicle to be predicted may extend toward the outside of a region that can be detected with the radar unit. In this case, the radar unit cannot detect an obstacle even if such an obstacle would exist ahead in the running way of the vehicle; however, there is the risk that the driver makes a wrong decision to that effect that no obstacle exists ahead in the running way of the vehicle because the driver is unaware of the situation that the predicted running way of the vehicle extends outside the detectable region to be detectable by the radar unit.

SUMMARY OF THE INVENTION

The object of the present invention is to provide a running-safety system for an automotive vehicle so adapted as to improve safety in driving the vehicle even if a detectable region to be detected by an obstacle-detecting means, such as a radar unit or the like, would vary.

In order to achieve the object as described hereinabove, the present invention consists of a running-safety system for an automotive vehicle, having an obstacle detecting means for detecting an obstacle existing ahead in a running way along which the vehicle is running, which comprises:

a detection means for detecting a variation of a detectable region to be detectable by the obstacle detecting means from a region of the running way to be detectable thereby when the vehicle is running under an ordinarily running condition; and a safety means for taking an action so as to allow the vehicle to run in a safe way when such a variation thereof is detected by the detection means.

This arrangement of the running-safety system for the vehicle as described hereinabove can ensure safety in driving the vehicle by allowing the safety means to be operated when the detectable region to be detected by the obstacle detecting means varies, particularly when the detectable region to be detectable thereby is reduced.

The safety means may comprise at least one of, for example, an alarm unit and an automatic brake system for reducing a speed of the vehicle.

Further, when the running-safety system is provided with a collision-avoiding means for avoiding a collision of the body of the vehicle with an obstacle existing ahead on the basis of a result of detection of the obstacle with the obstacle detecting means, the safety means may be of such a type as capable of changing a control logic for operating the collision-avoiding means in the direction of improving safety in driving the vehicle in the running way in which the vehicle is running.

Other objects, features and advantages of the present invention will become apparent in the course of the description of the preferred embodiments, which follows, with reference to the accompanying drawings.

DESCRIPTION OF THE PREFERRED EMBODIMENTS

Figure 1:
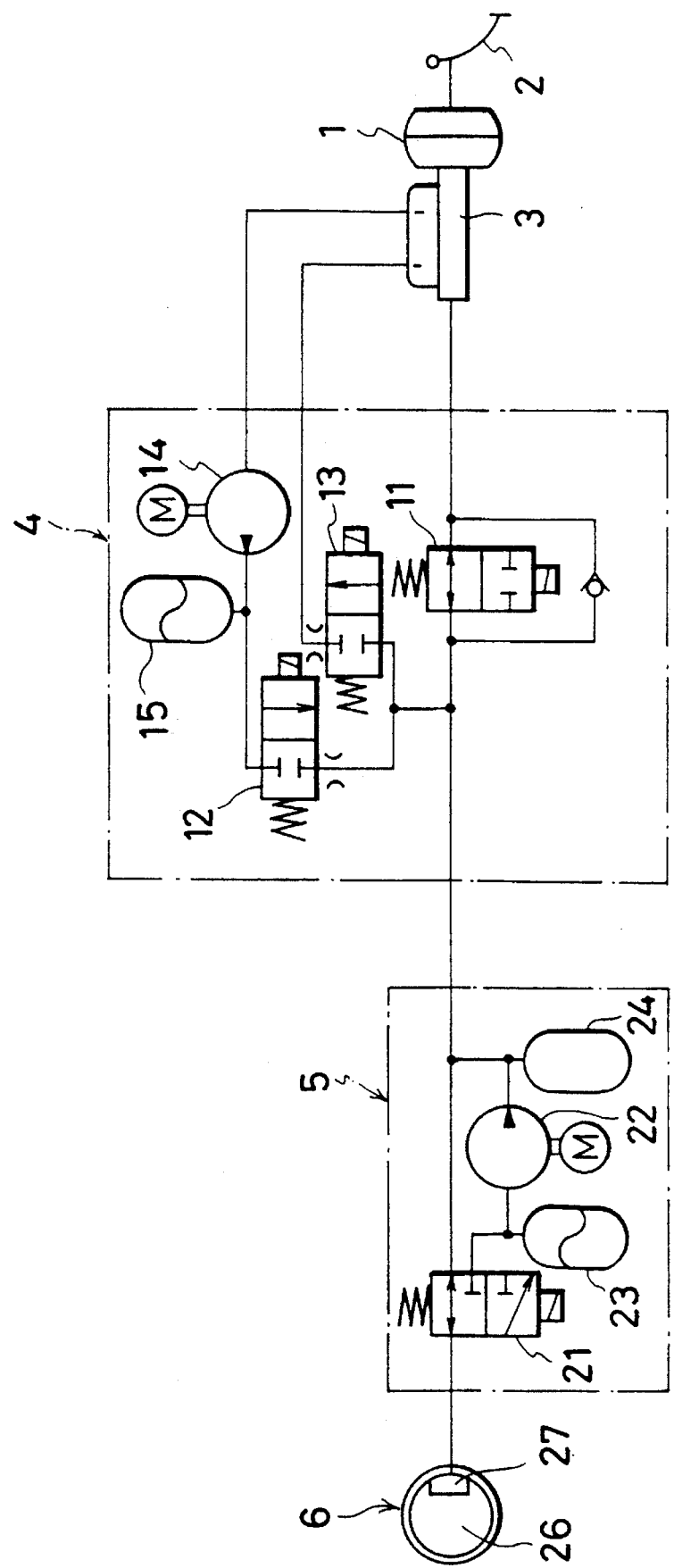
FIG. 1 is a circuit diagram showing a hydraulic circuit of an automatic brake system according to an embodiment of the present invention.
Figure 2:
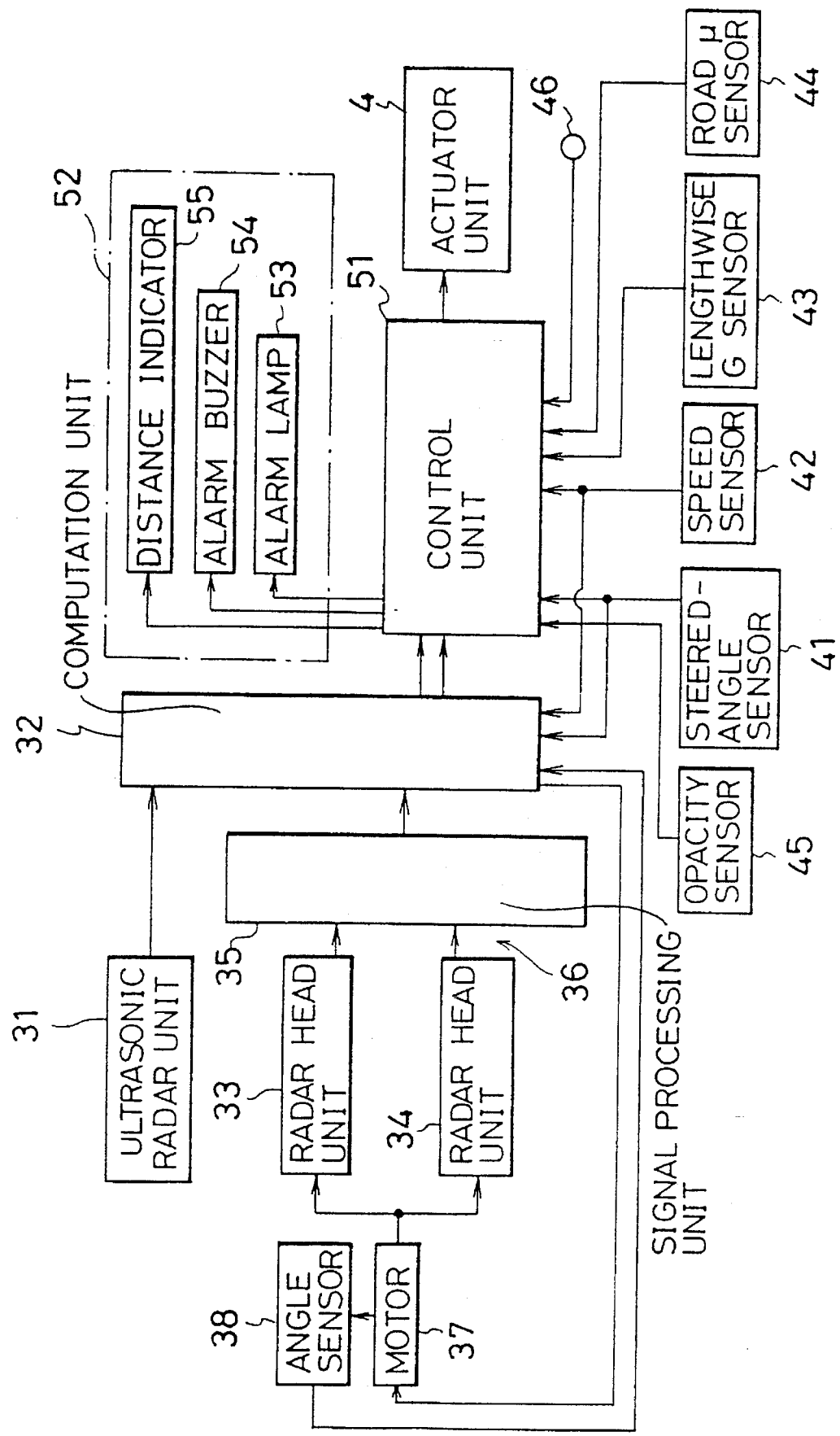
FIG. 2 is a block diagram showing the automatic brake system according to the embodiment of the present invention.

First Embodiment:

FIGS. 1 and 2 show an embodiment in which the present invention is applied to an automatic brake system for an automotive vehicle, in which FIG. 1 is the circuit diagram showing the hydraulic circuit of an automatic brake system according to the embodiment of the present invention, and FIG. 2 is the block diagram showing the automatic brake system according to the embodiment of the present invention.

As shown in FIG. 1, reference numeral 1 denotes a master vac for increasing the depressing force to be applied by depressing a brake pedal 2 with the driver. Reference numeral 3 denotes a master cylinder for generating the braking pressure in proportion to the depressing force increased by the master vac 1. The braking pressure generated by the master cylinder 3 is first fed to a hydraulic actuator unit 4 of an automatic brake system, followed by supplying the braking pressure through a hydraulic actuator unit 5 of an anti-skid system (ABS) to the corresponding brake unit 6 for each of the four wheels.

The actuator unit 4 of the automatic brake system has a shutter valve 11 for blocking a connection of the master cylinder 3 with the brake unit 6, a pressure-increasing valve 12, and a pressure-decreasing valve 13. Each of the three valves 11, 12, and 13 is a 2-port-2-position change-over valve of an electromagnetical type. Between the pressure-increasing valve 12 and the master cylinder 3 are interposed an oil pump 14 of a motor-drivable type and an accumulator 15 for holding the pressure oil at a constant pressure by storing the oil to be discharged from the oil pump 14. The wheels are braked with the corresponding brake units 6 in proportion to the depressed force applied to the brake pedal 2 when the shutter valve 11 is in its open position as well as the pressure-increasing valve 12 and the pressure-reducing valve 13 are in the closed position. The pressure oil is supplied from the accumulator 15 to the brake unit 6 of each wheel to thereby increase the braking pressure by switching the shutter valve 11 to its closed position and the pressure-increasing valve 12 to its open position when the pressure-reducing valve 13 is in its closed position. On the other hand, the braking pressure is reduced by returning the pressure oil from the brake units 6 when the pressure-increasing valve 12 is shifted to its closed position and the pressure-reducing valve 13 is switched to its open position.

The hydraulic actuator unit 5 of the anti-brake system (ABS) has a 3-port-2-position change-over valve 21 disposed at each wheel, which is so adapted as not to lock the wheels at the time of operation of the ABS by controlling the braking pressure to be applied to the brake units 6 by switching the change-over valve 21. Although the detailed configuration of the structure of the hydraulic actuator unit 5 is not described herein, the actuator unit 5 contains an oil pump 22 of a motor-drivable type and accumulators 23 and 24, in addition to the change-over valve 21. The brake unit 6 disposed for each wheel comprises a disc 26 arranged so as to rotate integrally with the corresponding wheel and a caliper 27 for clamping the disc 26 in response to the braking pressure applied from the master cylinder 3.

As shown in FIG. 2, reference numeral 31 denotes an ultrasonic radar unit disposed in a nearly middle position at a front portion of the body of the vehicle. Although not described in more detail in FIG. 2, the ultrasonic radar unit 31 has a transmitting unit and a receiving unit, which is so arranged as to transmit ultrasonic waves forward an obstacle existing ahead, such as other vehicles or the like running ahead of the vehicle in the running way thereof, from the transmitting unit and to receive the reflected ultrasonic waves from the obstacle, with the receiving unit. Then, after the ultrasonic radar unit 31 has received the reflected ultrasonic waves from the obstacle existing ahead in the running way of the vehicle, the ultrasonic radar unit 31 generates signals to a computation unit 32 that then computes a distance between the body of the vehicle and the obstacle and a relative speed of the vehicle on the basis of a difference of the time between the time when the ultrasonic waves were generated from the transmitting unit of the ultrasonic radar unit 31 and the time when the transmitted ultrasonic waves were reflected from the obstacle and received by the receiving unit thereof.

Reference numerals 33 and 34 denote left-hand and right-hand radar head units, respectively, disposed on the left side and the right side at the front portion of the body of the vehicle. The radar head units 33 and 34 have each a transmitting unit and a receiving unit, which is so arranged as to transmit pulse laser light forward an obstacle existing ahead in the running way of the vehicle, such as other vehicles running ahead in a forward direction on the running way thereof, from the transmitting unit and to receive the reflected pulse laser light from the obstacle existing ahead with the receiving unit. Then, after each of the radar head units 33 and 34 has received the reflected laser light from the obstacle existing ahead in the running way of the vehicle, each of the radar head units 33 and 34 generates signals through a signal processing unit 35 to the computation unit 32 that then computes a distance between the body of the vehicle and the obstacle existing ahead in the running way of the vehicle and a relative speed of the vehicle on the basis of a difference of the time between the time when the pulse laser light was generated from the transmitting unit of the radar head units 33 and 34 and the time when the transmitted laser light was reflected from the obstacle and received by the receiving unit thereof. The computation unit 32 is so arranged as to use the results of computation obtained on the basis of the signals from the left-hand and right-hand radar head units 33 and 34, i.e. the distance between the body of the vehicle and the obstacle detected as existing ahead in the running way of the vehicle, prior to the results of computation obtained on the basis of the signals from the ultrasonic radar unit 31, i.e. the distance between the body of the vehicle and the obstacle detected as existing forward in the running way of the vehicle. The direction in which the pulse laser light are to be transmitted from the left-hand and right-hand radar head units 33 and 34 and received thereby can be altered in a horizontal direction with a motor 37, and the operation of the motor 37 is controlled with the computation unit 32. Reference numeral 38 denotes an angle sensor for detecting the direction in which the pulse laser light is transmitted from the radar head units 33 and 34 and received thereby, on the basis of the angle at which the motor 37 rotates, and a signal detected by the angle sensor 38 is transmitted to the computation unit 32 that is so arranged as to reflect the direction of transmitting the pulse laser light and receiving the light reflected from the obstacle, which is computed by processing the signal from the angle sensor 38 with the signal processing unit 35.

The ultrasonic radar unit 31, the left-hand and right-hand radar head units 33 and 34, the signal processing unit 35, and the computation unit 32 consists of the obstacle detecting means 36.

The signals of the distance between the body of the vehicle and the obstacle existing ahead and the relative speed, produced by the computation unit 32, are transmitted to a control unit 51. Further, the control unit 51 is supplied with signals from a steered-angle sensor 41 for detecting a steered angle of each of the wheels, a speed sensor 42 for detecting a speed of the vehicle, a lengthwise G sensor 43 for detecting the magnitude of lengthwise acceleration of the vehicle, i.e. the magnitude of acceleration in a longitudinal direction of the vehicle, a road $\mu$ sensor 44 for detecting a friction coefficient ($\mu$) on a road surface of the running way of the vehicle, and an opacity sensor 45 for detecting an opacity of a lens of each of the left-hand and right-hand radar head units 33 and 34 as a measure for determining an extent of soiling or staining the lens thereof. The opacity sensor 45 functions as a means for detecting the timing at which a detectable distance in the running way of the vehicle to be detected by the obstacle detecting means 36 is reduced, or made shorter than the vehicle is running at usual conditions, due to rain drops, stains, soils or the like, which have been attached onto the lens of each of the left-hand and right-hand radar head units 33 and 34. Reference numeral 52 denotes an alarm display unit arranged in an instrument panel disposed in a cabin of the body of the vehicle, and the alarm display unit 52 comprises an alarm lamp 53 for receiving signals from the control unit 51, an alarm buzzer 54, and a distance indicator unit 55. The control unit 51 can function as a means for making a decision on the basis of the signals on the distance between the body of the vehicle and the obstacle existing ahead in the running way of the vehicle transmitted from the computation unit 32 to the effect that the body of the vehicle has the possibility of colliding with the obstacle detected by the obstacle detecting means 36. As the control unit 51 has reached a decision that the body of the vehicle is about to collide with the obstacle existing ahead in the running way of the vehicle, it generates a signal to the alarm buzzer 54 that generates a buzzer to the driver for drawing an attention in order to cause the driver to take the necessary action to avoid a collision of the vehicle existing ahead with the obstacle or it generates a signal to the hydraulic actuator unit 4 of the automatic brake unit to thereby apply the braking force to the wheels automatically.

Figure 3:
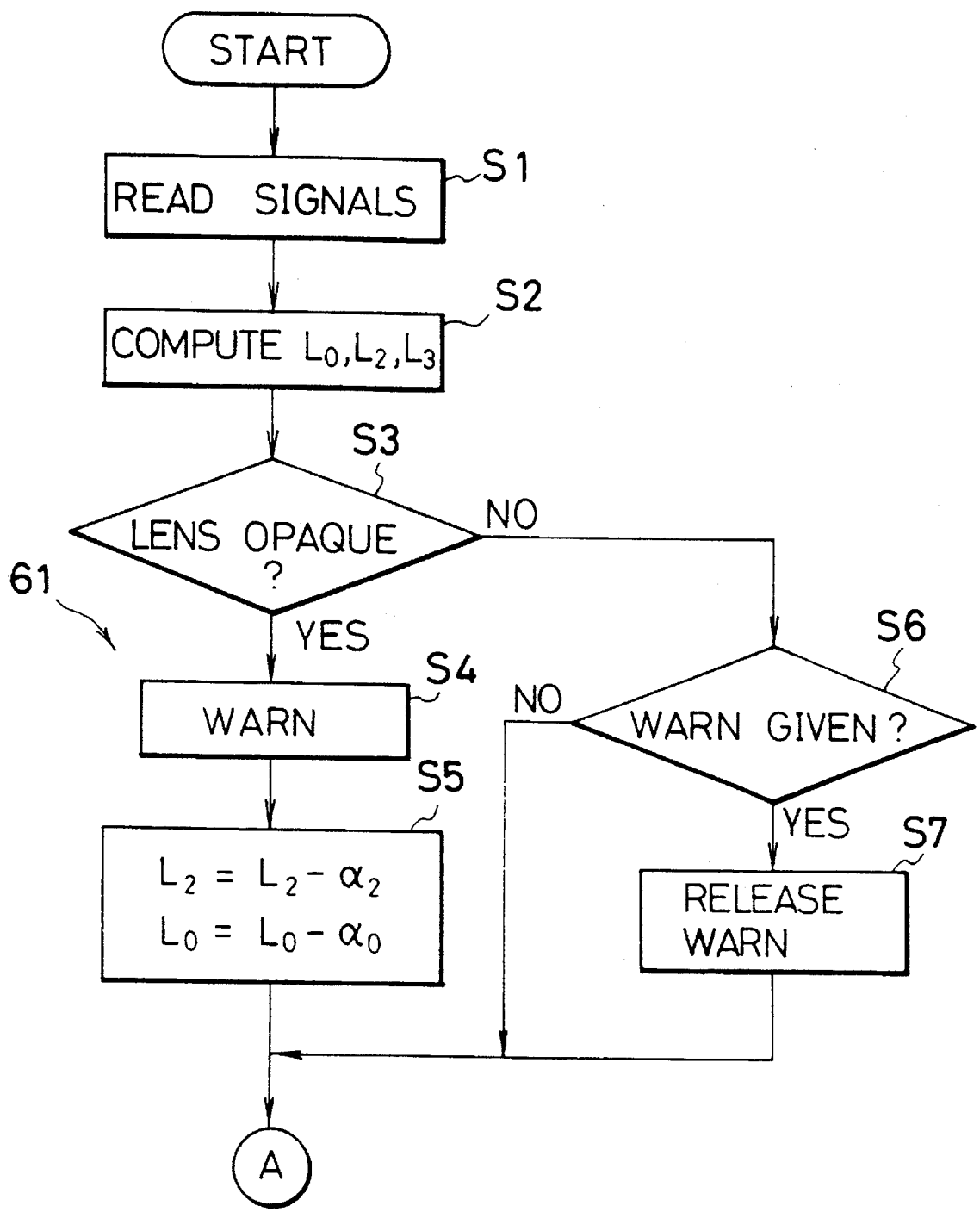
FIG. 3 is a flowchart showing a control logic for the automatic braking.
Figure 4:
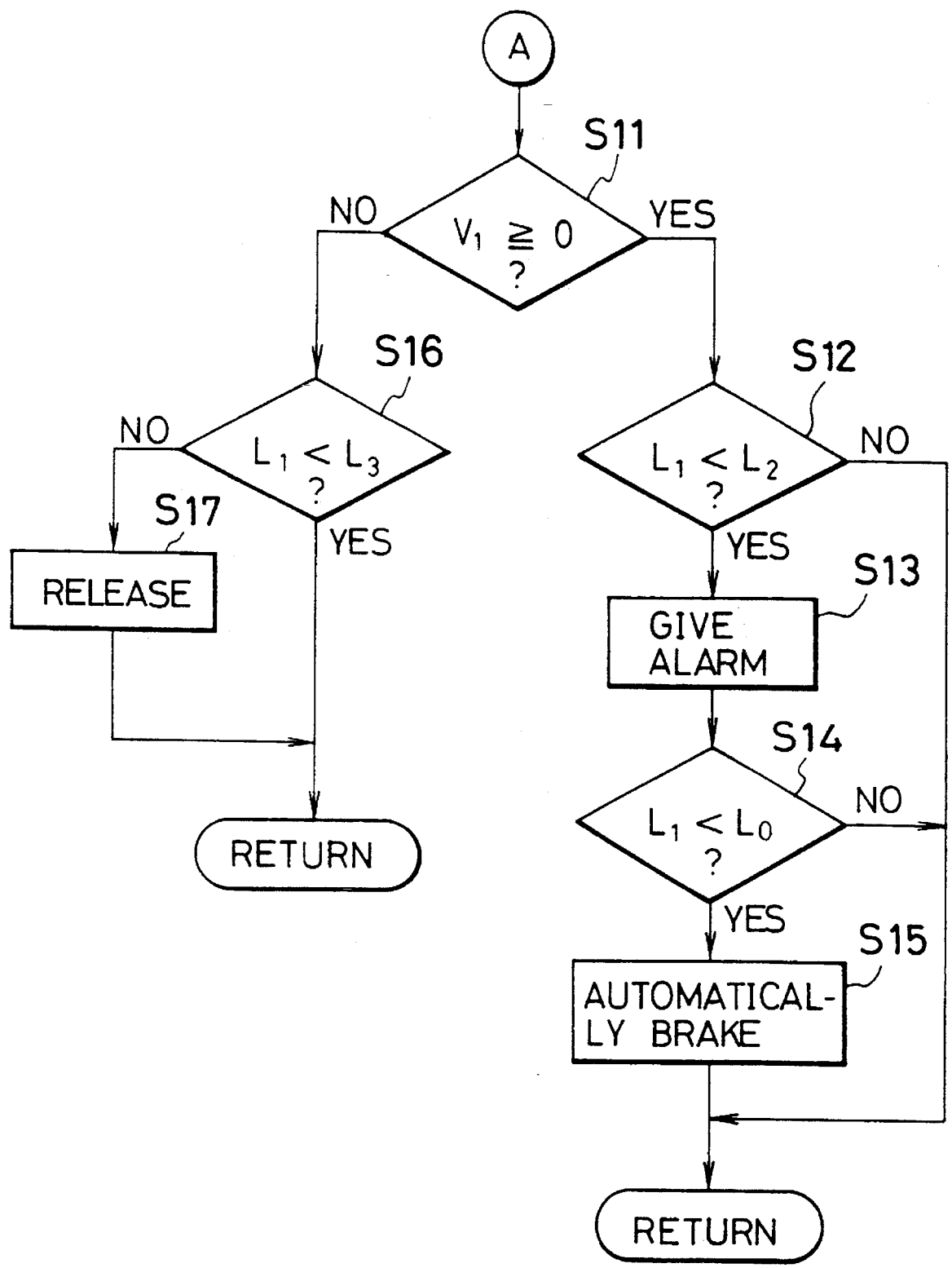
FIG. 4 is a flowchart showing a control logic for the automatic braking.

A description will now be made of the control logic for the automatic braking with reference to the flowcharts as shown in FIGS. 3 and 4.

Figure 5:
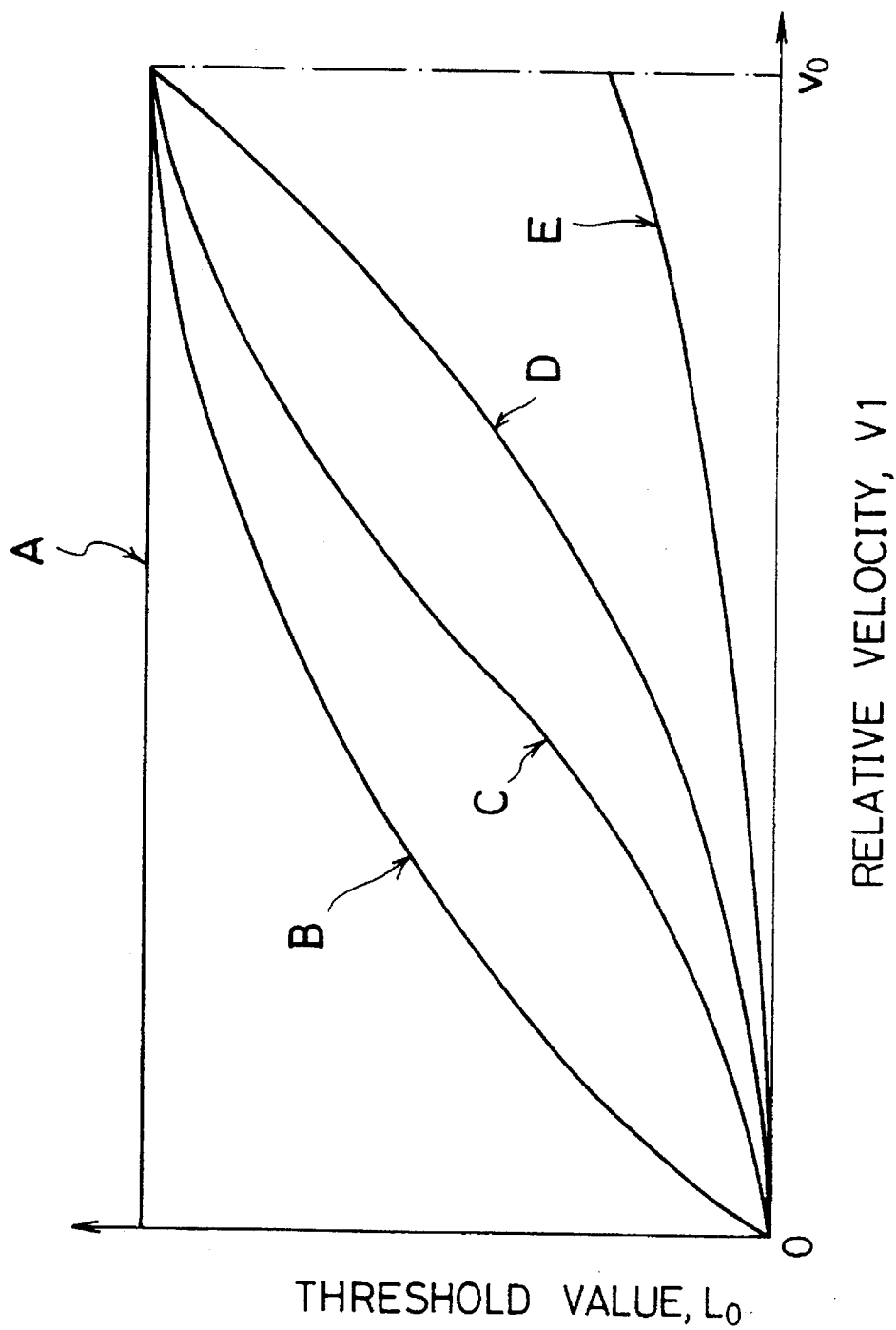
FIG. 5 is a map showing the process for computing a threshold value for avoiding a collision of the body of the vehicle with an obstacle.

As shown in FIG. 3, first, at step S1, there were read signals on the distance L1 between the body of the vehicle and the obstacle existing ahead in the running way of the vehicle, the relative speed V1 of the speed of the vehicle relative to the speed or position of the obstacle, the vehicle speed Vo of the vehicle, and so on, followed by proceeding to step S2 at which a variety of threshold values L0, L2, and L3 were computed. The threshold value L0 represents the distance between the body of the vehicle and the obstacle existing ahead in the running way of the vehicle as a condition for starting the automatic braking in order to avoid a collision of the body of the vehicle with the obstacle existing ahead, when there is the risk that the vehicle collides with the obstacle. The threshold value L0 can be computed on the basis of the map as shown in FIG. 5. The threshold value L2 represents the distance between the body of the vehicle and the obstacle existing ahead as a condition for producing an alarm prior to the start of the automatic braking, and the threshold value L2 is set so as to become greater by a predetermined value than the threshold value L0. The threshold value L3 represents the distance between the body of the vehicle and the obstacle existing ahead as a condition for releasing the automatic braking on account of the fact that the possibility of the body of the vehicle colliding with the obstacle does not exist any more. The threshold value L3 is set so as to be greater by a predetermined value than the threshold value L0 in usual cases, although it can be set so as to be smaller by a predetermined value than the threshold value L0 in some cases.

As has been described hereinabove, the threshold value L0 is computed on the basis of the map as shown in FIG. 5.

In the map, a threshold line A represents the distance between the body of the vehicle and the body of another vehicle running ahead of the vehicle, which is required in order to avoid a collision with the another vehicle when the another vehicle would have stopped upon a collision with an obstacle existing ahead of the another vehicle. The distance between the body of the vehicle and the body of the another vehicle can always be represented by the same value (as represented by $Vo^2/2 \mu g$), whatever the relative speed V1 of the vehicle is, as represented when an obstacle existing ahead is a standing still or resting object, i.e. when the relative speed V1 being the same as the vehicle speed Vo). A threshold line B represents the distance between the body of the vehicle and another vehicle existing ahead (as represented by $V1\times(2Vo-V1)/2 \mu g$), which is required in order to avoid a collision with the another vehicle when the another vehicle brakes to a full extent. A threshold line C represents the distance between the body of the vehicle and another vehicle existing ahead, which is required in order to avoid a collision with the another vehicle when the another vehicle brakes at the rate of deceleration as represented by $\mu/2$ g. A threshold line D represents the distance between the body of the vehicle and another vehicle existing ahead (as represented by $V1^2/2 \mu g$), which is required in order to avoid a collision with the another vehicle when the another vehicle is running at a constant speed. A threshold line E represents the distance between the body of the vehicle and another vehicle existing ahead, which can alleviate the impact of a collision with another vehicle upon the collision even when the vehicle has been braked automatically. In this embodiment according to the present invention, the threshold line B is selected and the threshold value L0 is given from the threshold line B, which corresponds to the relative speed V1 at the current time.

Figure 6:
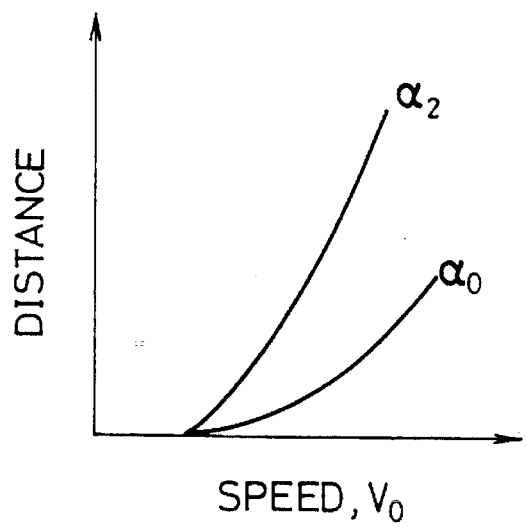
FIG. 6 is a graph showing a function of predetermined values $\alpha 2$ and $\alpha 0$.

After the computation of the threshold values L0, L2, and L3 at step S2, the program flow goes to step S3 at which a decision is made to determine if the lens of each of the left-hand and right-hand radar head units 33 and 34 is stained or soiled on the basis of the signal on the lens opacity sensor 45, that is, if the detectable distance to be detectable by the obstacle detecting means 36 is made shorter than the detectable distance to be detectable thereby at usual conditions where the lens thereof is not stained or soiled. When it is decided at step S3 that the lens of either of the left-hand or right-hand radar head units 33 or 34 is stained or soiled to such an extent as reducing the detectable distance to be detectable by the obstacle detecting means 36 at a predetermined rate, then the program flow goes to step S4 at which the alarm lamp 53 is turned on and off giving an warning that the lens of either of the left-hand or right-hand radar head unit 33 or 34 is soiled or stained, followed by proceeding to step S5 at which the predetermined values $\alpha 2$ and $\alpha 0$ are subtracted from the threshold values L2 and L0, respectively, and then proceeding to step S11. As shown in FIG. 6, the predetermined values $\alpha 2$ and $\alpha 0$ are so set as to increase in a manner as a curve of the second order as the vehicle speed Vo increases.

Now, a description will be made of the reason for subtraction of the predetermined values $\alpha 2$ and $\alpha 0$ from the threshold values L2 and L0, respectively, with reference to FIG. 7.

Figure 7:
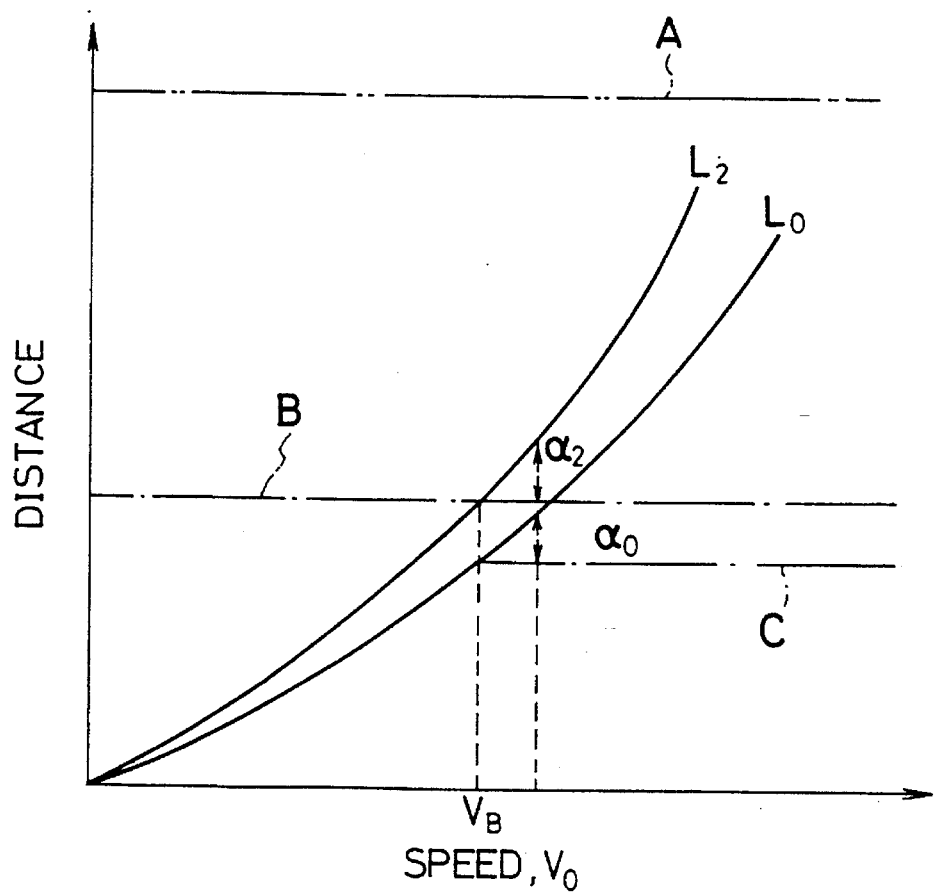
FIG. 7 is a graph showing the relation of the distance vs. the speed of the vehicle.

FIG. 7 is the graph representing the distance between the body of the vehicle and the obstacle as an x-axis and the speed Vo as a y-axis. In FIG. 7, curved lines L2 and L0 represent the threshold value L2 set for starting producing the alarm and the threshold value L0 set for starting the automatic braking, respectively. Both of the curved lines L2 and L0 are so set as to become lower than a usual detectable distance A to be detectable by the obstacle detecting means 36 in such a usual case as the lens of each of the left-hand and right-hand radar head units 33 and 34 is not stained or soiled. If the detectable distance becomes lower than the usual detectable distance A and it lowers to a detectable distance as indicated by reference symbol B due to the stains or the like attached on the lens of either of the radar head unit 33 or 34, the curved lines L2 and L0 are so set as to become higher than the detectable distance B when the vehicle speed Vo exceeds a certain speed of the vehicle. In this case, when the speed Vo is set in a position higher than the position of an intersection VB of the curved line L2 with the detectable distance B, the threshold value L2 for starting producing the alarm is set to the detectable distance B and the threshold value L0 for starting the automatic braking is set to a line C that is the value for the curved line L0 when the speed Vo is equal to the intersection VB and that is so set as to become smaller by a predetermined value. The curved line L2 is set to be greater by the predetermined value $\alpha 2$ than the line B, and the curved line L0 is set to be greater by the predetermined value $\alpha 0$ than the line C. Hence, the subtraction of the predetermined values $\alpha 2$ and $\alpha 0$ from the threshold values L2 and L0, respectively, is in order to make the threshold values L2 and L0 equal to or shorter than the detectable distance B to be detectable by the obstacle detecting means 36 and in order to ensure that the alarm is always given prior to the start of the automatic braking. Further, the processes at step S3 to S5 consist of a decision logic altering means 61 for altering a decision logic for deciding the possibility of a collision of the body of the vehicle with the obstacle to a safe side by changing the threshold values L2 and L0, when the detectable distance to be detectable by the obstacle detecting means 36 is reduced due to the opacity of the lens of either of the left-hand or right-hand radar head unit 33 or 34.

On the other hand, when a decision is made at step S3 that the lens of each of the left-hand and right-hand radar head units 33 and 34 is not soiled or stained on the basis of the signal on the lens opacity sensor 45, that is, that the detectable distance to be detectable by the obstacle detecting means 36 is not made shorter than the detectable distance to be detected thereby at usual conditions, then the program flow goes to step S6 at which it is decided to determine if the warning is given by turning the alarm lamp 53 on and off. When the decision at step S6 gives the affirmative result, then the warning is released at step S7, followed by proceeding to step S11.

Turning now to FIG. 4, it is decided at step S11 to determine if the relative speed V1 of the body of the vehicle relative to the obstacle existing ahead is equal to or greater than zero, that is, if the vehicle is approaching the obstacle. When the result of the decision made at step S11 indicates that the body of the vehicle is approaching the obstacle existing ahead, then the program flow goes to step S12 at which it is decided to determine if the distance L1 between the body of the vehicle and the obstacle existing ahead is smaller than the threshold value L2 set for determining the start of giving the alarm. When the decision gives the affirmative result at step S12, then the program flow goes to step S13 and the alarm buzzer 54 produces an alarm sound, followed by proceeding to step S14 at which it is decided to determine if the distance L1 between the body of the vehicle and the obstacle existing ahead is smaller than the threshold value L0 set for starting the automatic braking. If the result of the decision at step S14 indicates that the distance L1 is smaller than the threshold value L0, then the program flow goes to step S15 at which the actuator unit 4 is operated so as to automatically brake the brake units 6 to a full extent, followed by returning the program flow.

On the other hand, when the decision at step S12 or S14 gives the negative result, then the program flow is immediately returned.

When the decision at step S11 gives the negative result, that is, when it is decided that the obstacle existing ahead is going away from the vehicle or vice versa, then the program flow goes to step S16 at which a decision is made to determine if the distance L1 between the body of the vehicle and the obstacle existing ahead is smaller than the threshold value L3 set for determining the timing for releasing the automatic braking. When the decision at step S16 gives the affirmative result, then the program flow is returned intact. On the other hand, when the decision at step S16 gives the negative result, then the automatic braking is released at step S17, followed by returning the program flow.

In instances where the detectable distance to be detected by the obstacle detecting means 36 becomes shorter when the lens of either of the left-hand or right-hand radar head unit 33 or 34 is stained or soiled than in usual cases where neither the left-hand radar head unit 33 nor the right-hand radar head unit 34 are stained or soiled, in controlling the automatic brake system in accordance with the flowchart as have been described hereinabove, both of the threshold values L2 and L0 are reduced each to a distance shorter than the detectable distance to be detectable by the obstacle detecting means 36 and the threshold value L0 is altered to become always smaller than the threshold value L2. Hence, the alarm buzzer 54 can produce an alarm sound always before the start of the automatic braking in order for the driver to draw attention to the fact that the body of the vehicle is approaching the obstacle existing ahead, thereby preventing the driver in advance from falling into a panic due to the rapid operation of the automatic braking and improving safety in driving the vehicle.

Second Embodiment:

A second embodiment of the safety system according to the present invention is so arranged as for the body of the vehicle to avoid a collision with an obstacle existing ahead in the running way of the vehicle even when the detectable distance to be detectable by the obstacle detecting means is reduced due to rain falling.

Figure 8:
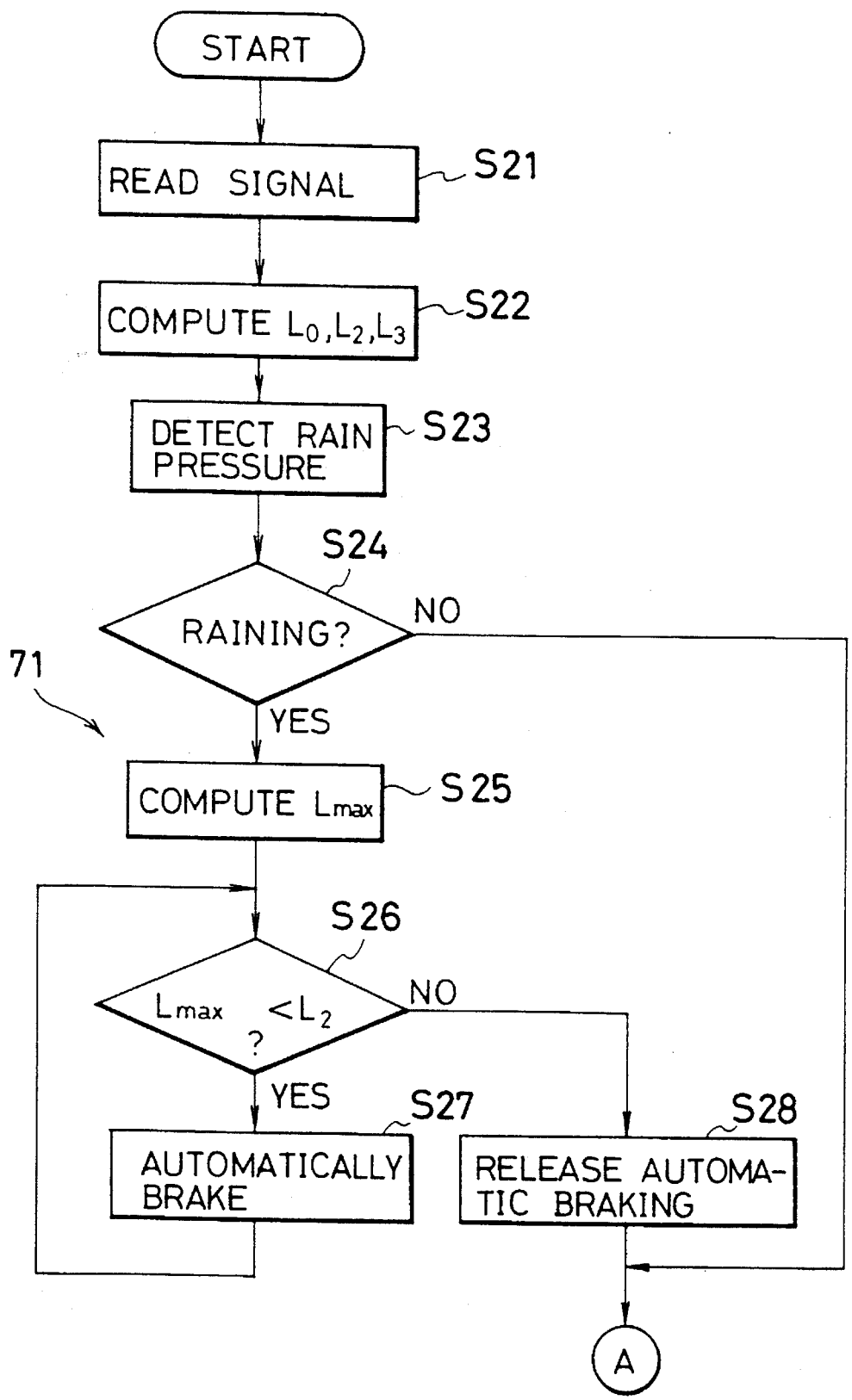
FIG. 8 is a flowchart showing a variant of a control logic for the automatic braking.

FIG. 8 is the flowchart showing a variant of the control logic for the automatic braking, in which the automatic brake system is provided with a rain-falling sensor 46 for detecting rain falling and a pressure of rain, in place of the lens-opacity sensor 45 as shown in FIG. 2. Signals generated from the rain-falling sensor 46 are entered into the control unit 51.

In the flowchart as shown in FIG. 8, first, at step S21, there are read the distance L1 between the body of the vehicle and the obstacle existing ahead in the running way of the vehicle, the relative speed V1 of the speed of the vehicle relative to the position of the obstacle, the vehicle speed Vo of the vehicle, and other necessary data, followed by proceeding to step S22 at which the threshold values L0, L2, and L3 are computed.

Figure 9:
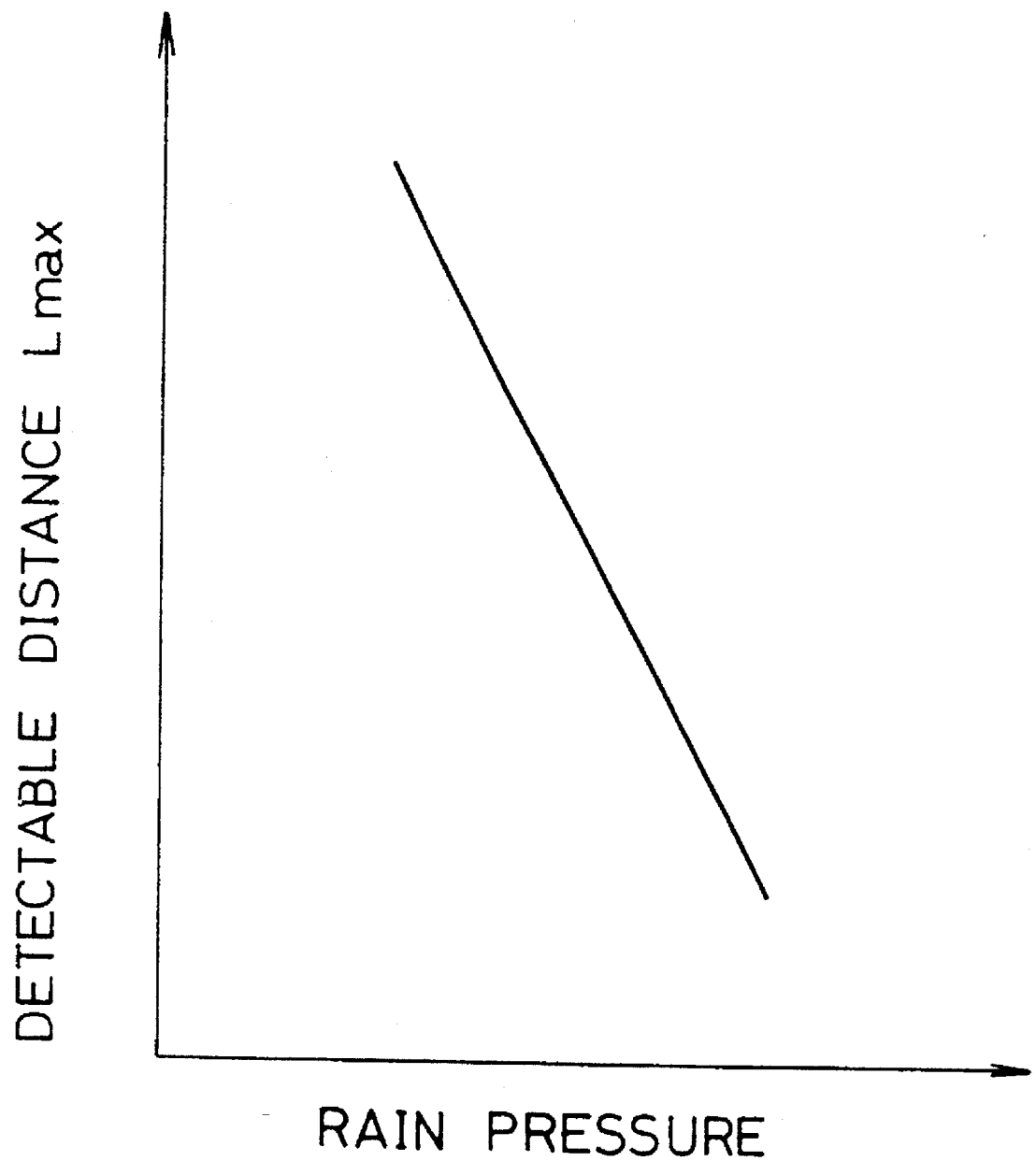
FIG. 9 is a characteristic diagram showing the relation of the detectable distance vs. the rain pressure.

Then, at step S23, it is detected by the rain-falling sensor 46 to determine if rain is falling and, if rain is falling, what is the pressure of the rain, followed by proceeding to step S24 at which it is decided to determine if the rain is falling to such an extent as being defined in advance as 'rain falling' in the present invention. When the decision at step S24 gives the affirmative result, then the program flow goes to step S26 at which the detectable distance Lmax to be detectable with the obstacle detecting means 36 (the left-hand and right-hand radar head units 33 and 34) at the time of the rain falling is computed on the basis of the map as shown in FIG. 9. It is found as shown in FIG. 9 that the detectable distance Lmax to be detectable with the obstacle detecting means 36 is set so as to become in inverse proportion to the pressure at which the rain falls.

Thereafter, at step S26, it is decided to determine if the detectable distance Lmax to be detectable with the obstacle detecting means 36 at the time of rain falling is smaller than the threshold value L2 set to determine the timing for giving the alarm. When the decision at step S26 gives the affirmative result, then the program flow goes to step S27 at which the wheels are braked automatically. After the vehicle speed Vo has been reduced by the automatic braking and the distance L2 for starting giving the alarm becomes shorter than the detectable distance Lmax, then the program flow goes to step S28 at which the automatic braking is released. Thereafter, the control is performed in accordance with the processes at steps S11–S17 as shown in FIG. 4. On the other hand, when it is decided at step S24 that no rain is falling, the control is performed immediately in accordance with the processes at steps S11–S17 as shown in FIG. 4. The processes at steps S24–S28 comprises a decision-logic altering means 71 that is arranged to shift a decision logic for determining the possibility of the vehicle of colliding with the obstacle existing ahead to a safe side so as to make the distance L2 equal to or smaller than the distance Lmax by making deceleration with the automatic braking, when the detectable distance Lmax to be detectable with the obstacle detecting means 36 is reduced due to the rain falling. Further, the rain-falling sensor 46 can function as a means for detecting the timing at which the detectable distance Lmax to be detectable by the obstacle detecting means 36 has been reduced to a lower level on account of the rain falling than in usual cases where no rain is falling.

In summary, when the detectable distance to be detectable by the obstacle detecting means 36 is made shorter due to the rain falling than in usual cases, that is, when no rain is falling, by controlling the automatic brake system in accordance with the flowchart as shown in FIG. 8, the braking is operated automatically to reduce the vehicle speed Vo, thereby making the distance L2 equal to or shorter than the detectable distance Lmax. Hence, when the body of the vehicle is approaching the obstacle existing ahead even during rain falling, the alarm is produced, followed by operating the automatic braking, in the same manner as driving the vehicle during no rain falling; hence, the vehicle can avoid a collision with the obstacle existing ahead with certainty.

Third Embodiment:

The third embodiment of the safety system according to the present invention is so arranged as for the vehicle to avoid a collision with an obstacle existing ahead at a so-called blind curved corner in the running way of the vehicle.

Figure 10:
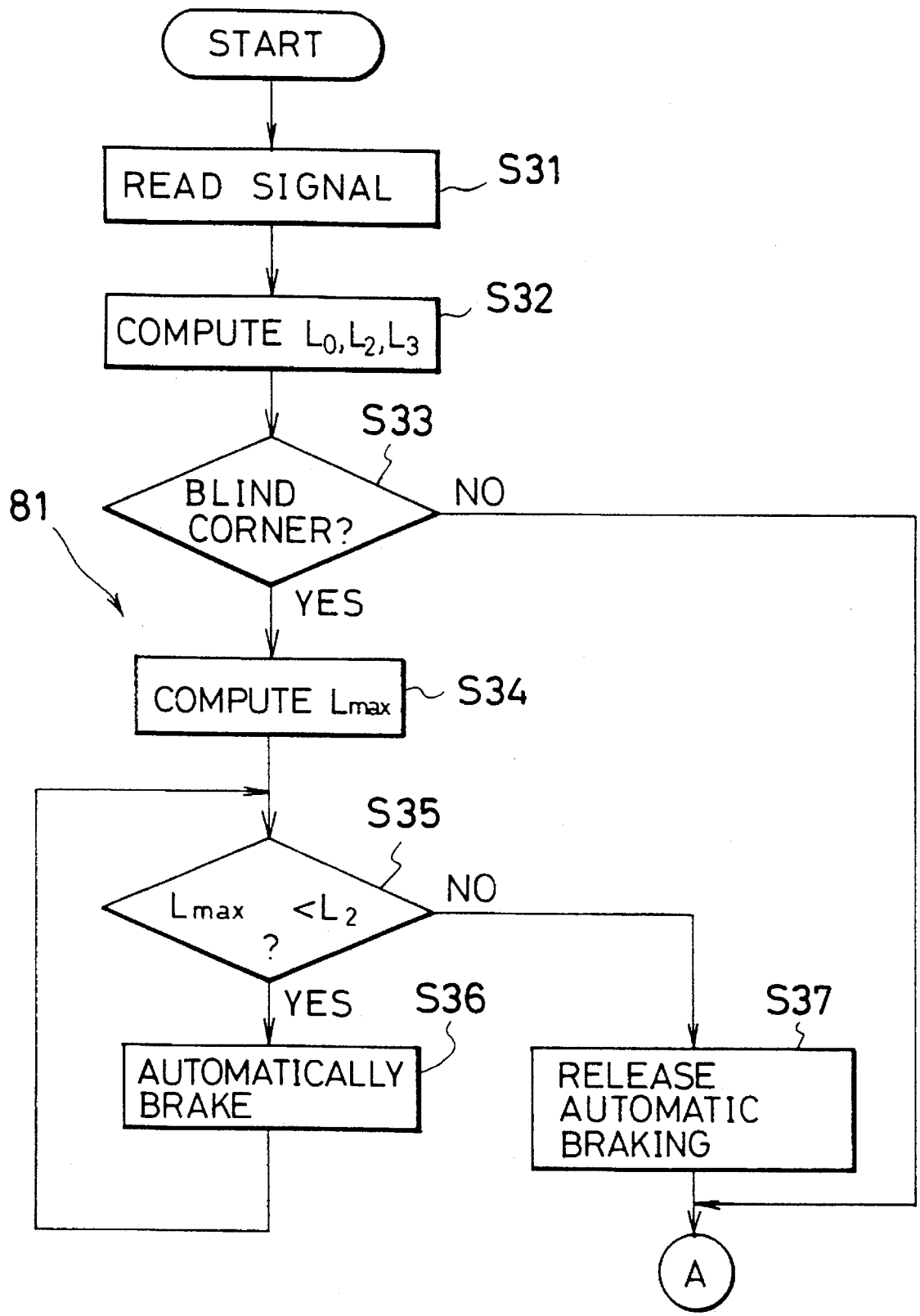
FIG. 10 is a flowchart showing a variant of a control logic for the automatic braking.

FIG. 10 is the flowchart showing a variant of the control logic for the automatic braking.

First, at step S31, there are read signals on the distance L1 between the body of the vehicle and the obstacle existing ahead, the relative speed V1 of the speed of the vehicle relative to the speed or position of the obstacle, the vehicle speed Vo of the vehicle, and so on, followed by proceeding to step S32 at which the threshold values L0, L2, and L3 are computed.

Thereafter, at step S33, it is decided to determine if a road on which the vehicle is running is curved and an inward curved side of the curved road is a so-called blind curved corner. This decision is performed on the basis of information to be gathered from markers disposed on the road surface on the road for providing the information on the road status and so on or other means or on the basis of information to be detected with the obstacle detecting means 36 mounted to the body of the vehicle from, for example, a group of obstacles existing ahead, e.g. a group of reflectors of guide rails or a group of vehicles running ahead. When the decision at step S33 gives the affirmative result, then the program flow goes to step S34 at which the detectable distance Lmax to be detectable on the running way of the vehicle with the obstacle detecting means 36 is computed by the following formula:

$$Lmax = (2Rb)^{1/2}$$

where

R is the radius of curvature of the blind curved corner; and b is the distance between the central line of the road and the road edge.

Thereafter, at step S35, it is decided to determine if the detectable distance Lmax is smaller than the distance L2 set for producing the alarm. When the decision at step S35 gives the affirmative result, then the program flow goes to step S36 at which the automatic braking is performed. After the automatic braking has reduced the vehicle speed Vo and the distance L2 became equal to or smaller than the detectable distance Lmax, then the program flow goes to step S37 at which the automatic braking is released. Thereafter, the control is performed in accordance with the processes at steps S11–S17. On the other hand, when it is decided at step S33 that no blind curve exists, the control is performed immediately in accordance with the processes at steps S11–S17 as shown in FIG. 4. The processes at steps S33–S37 comprises a decision-logic altering means 81 that is arranged to shift a decision logic for determining the possibility of the vehicle of colliding with the obstacle existing ahead to a safe side so as to make the distance L2 equal to or smaller than the distance Lmax by making deceleration with the aid of the automatic braking, when the detectable distance Lmax to be detectable with the obstacle detecting means 36 is reduced due to the existence of such a blind curve.

In summary, when the detectable distance to be detectable by the obstacle detecting means 36 on the running way of the vehicle becomes shorter due to the existence of the blind curved corner than when the vehicle is running on a straight road by controlling the automatic brake system in accordance with the flowchart as shown in FIG. 10, the automatic braking is performed so as to reduce the vehicle speed Vo, thereby making the distance L2 equal to or shorter than the detectable distance Lmax. Hence, when the body of the vehicle is approaching the obstacle existing ahead, the alarm is produced, followed by operating the automatic braking and avoiding a collision with the obstacle existing ahead with certainty.

Figure 11:
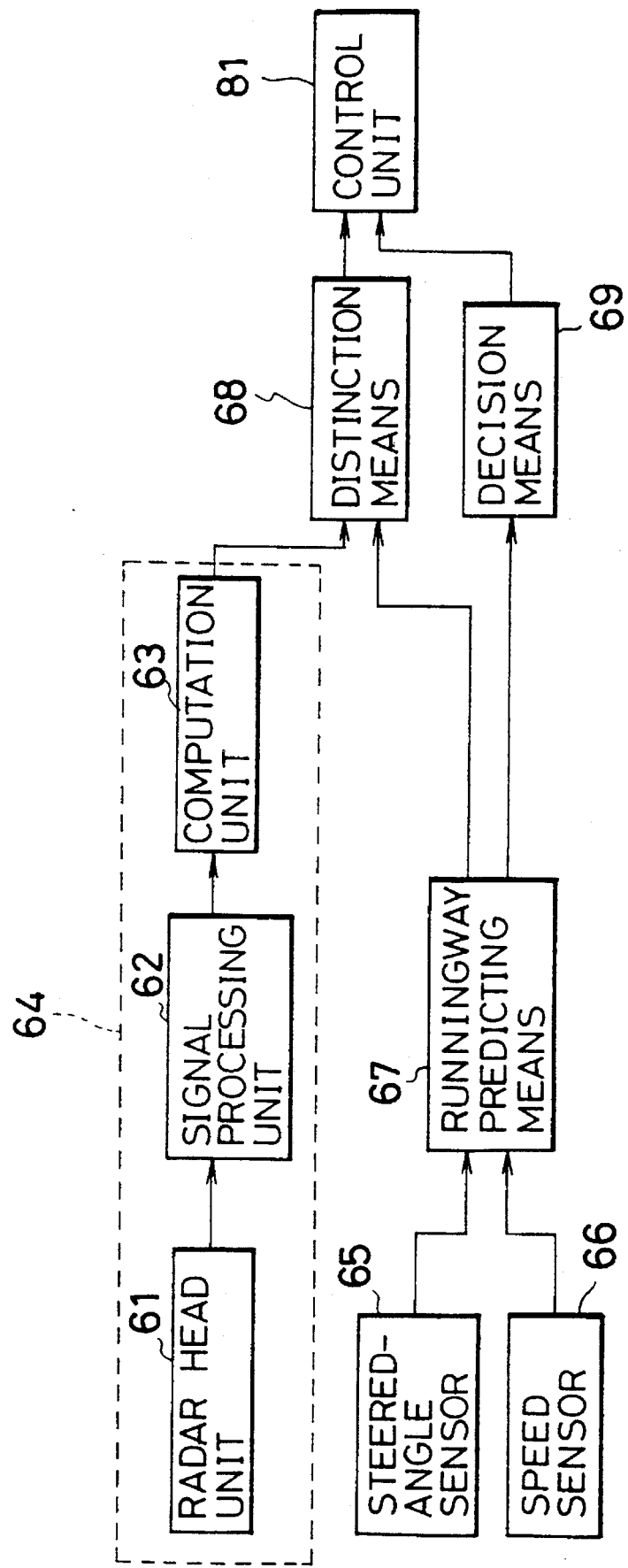
FIG. 11 is a block diagram showing a system for detecting an obstacle according to an embodiment of the present invention.

Fourth Embodiment:

As shown in FIG. 11, reference numeral 61 denotes a radar head unit disposed at a front portion of the body of the vehicle. The radar head unit 61 has a transmitting unit and a receiving unit, which is so arranged as to transmit pulse laser light forward an obstacle existing ahead in the running way in which the vehicle is running, such as other vehicles running ahead in the running way of the vehicle, from the transmitting unit and to receive the reflected pulse laser light from the obstacle with the receiving unit. The radar head unit 61 is a system of a scanning type capable of scanning the running way of the vehicle in a horizontal direction at a relatively wide angle with the pulse laser light transmitted from the transmitting unit. Then, after the radar head unit 61 has received the reflected pulse laser light from the obstacle existing ahead in the running way of the vehicle, the radar head unit 61 generates signals through a signal processing unit 62 to a computation unit 63 that then computes a distance between the body of the vehicle and the obstacle existing ahead within the scanning area and a direction in which the obstacle exists relative to the body of the vehicle on the basis of a difference of the time between the time when the pulse laser light was generated from the transmitting unit of the radar head unit 61 and the time when the transmitted laser light was reflected from the obstacle and received by the receiving unit thereof. A radar unit 64 of a scanning type capable of detecting the obstacle existing ahead in the running way of the vehicle consists of the radar head unit 61, the signal processing unit 62, and the computation unit 63.

As shown in FIG. 11, reference numeral 65 denotes a steered-angle sensor as a means for detecting a steered angle of a steering wheel, and reference numeral 66 denotes a speed sensor for detecting the vehicle speed of the vehicle. Signals monitored and detected by the steered-angle sensor 65 and the speed sensor 66 are entered into a running-way predicting means 67 is so adapted as to predict a running way of the vehicle on the basis of the steered angle θH of the steering wheel and the vehicle speed Vo by specifically computing a radius of curvature, R, of the running way on which the vehicle is running. Further, the running-way predicting means 67 is so adapted as to compute an angle β at which the body of the vehicle slides in a lateral direction relative to the direction in which the vehicle is running ahead. The radius R and the laterally slipping angle β can be computed by the following formulas:

$$R = (1 + AVo^2)l \frac{N}{\theta H}$$

$$\beta = \frac{-1 + \frac{m}{2l} \times \frac{lf}{lrKr} \times Vo^2}{1 + AVo^2} \times \frac{lr}{l} \times \frac{\theta H}{N}$$

where

A is the stability factor;

N is the steering gear ratio;

l is the wheel base;

lf is the distance between gravity of the body of the vehicle and the front wheels;

lr is the distance between gravity of the body of the vehicle and the rear wheels;

m is the body weight of the body of the vehicle; and

Kr is the cornering power per one rear wheel.

The signals generated from the computation unit 63 and the running-way predicting means 67 are entered into a distinction means 68 that is so adapted as to distinguish the nearest obstacle located in the nearest position in the running way of the vehicle, which the vehicle is approaching, among the obstacles detected by the radar unit 64 within a given region along the running way predicted by the running-way predicting means 67. The nearest obstacle is distinguished by the distinction means 68 in substantially the same manner as in the way as the obstacles existing ahead are detected in the given region along the running way of the vehicle by the radar unit 64. Data on the nearest obstacle distinguished by the distinction means 68 is entered into a control unit 81 of the automatic brake system. The control unit 81 is so adapted as to make a decision to determine if there is the risk that the vehicle collides with the nearest obstacle.

In addition, the signals generated from the running-way predicting means 67 are entered into a decision means 69 that is so arranged as to make a decision to determine if the running way of the vehicle predicted by the running-way predicting means 67 extends to a region outside the detectable region to be detectable by the radar unit 64. Then, the result of decision made by the decision means 69 is entered into the control unit 81 of the automatic brake system, the control unit 81 being adapted to make deceleration so as to allow the running way of the vehicle to be held within the detectable distance to be detectable by the radar unit 64 by operating the automatic brake system functioning as a safety system, when the running way of the vehicle extends to a region outside of the detectable distance to be detectable by the radar unit 64; hence, the control unit 81 can also function as an operation control means for the obstacle detecting means 63.

Figure 12:
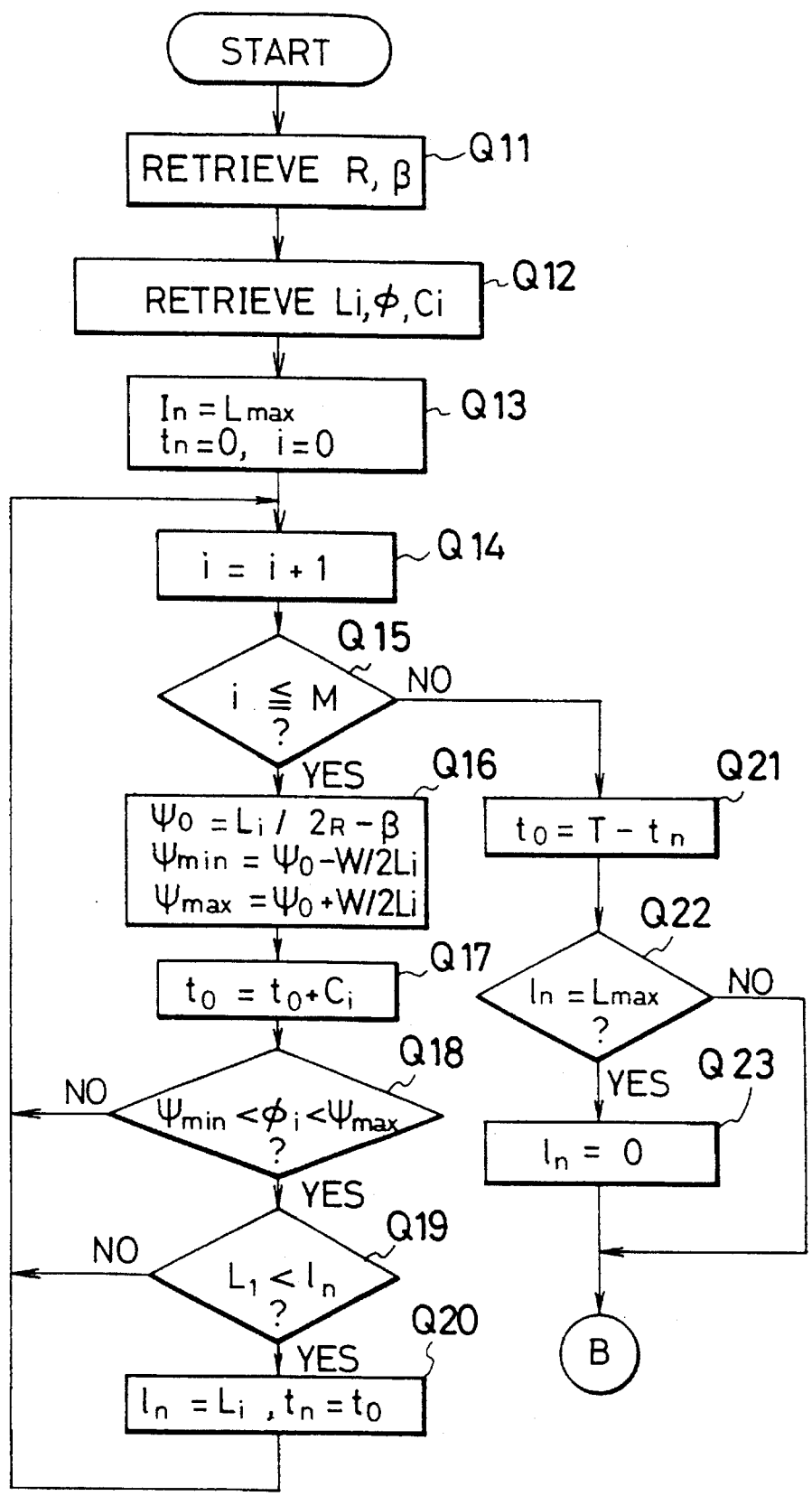
FIG. 12 is a flowchart showing the process for distinguishing a nearest obstacle with a distinction means.
Figure 13:
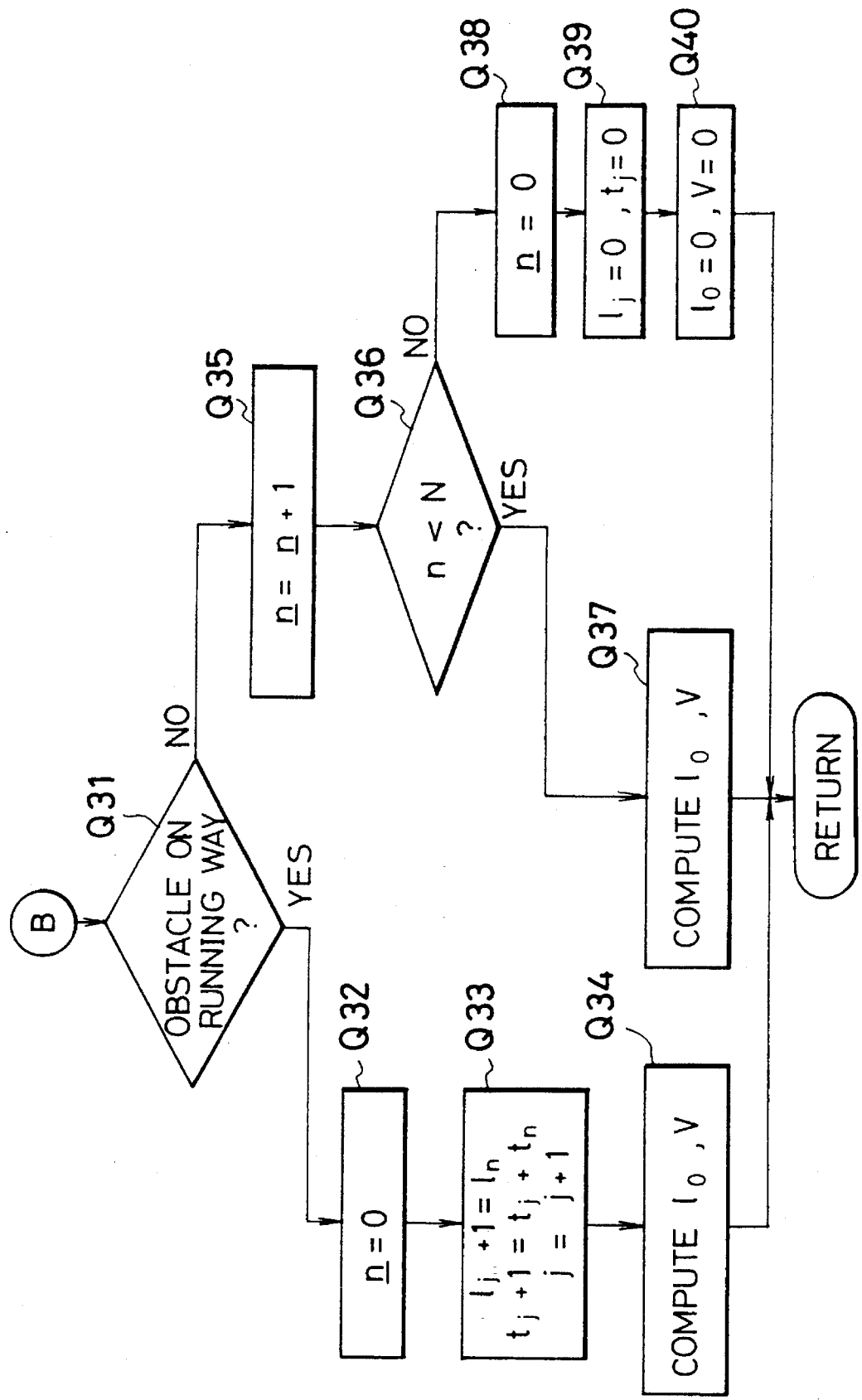
FIG. 13 is a flowchart showing the process of, for example, computing the distance between the body of the vehicle and the nearest obstacle with the distinction means.
Figure 14:
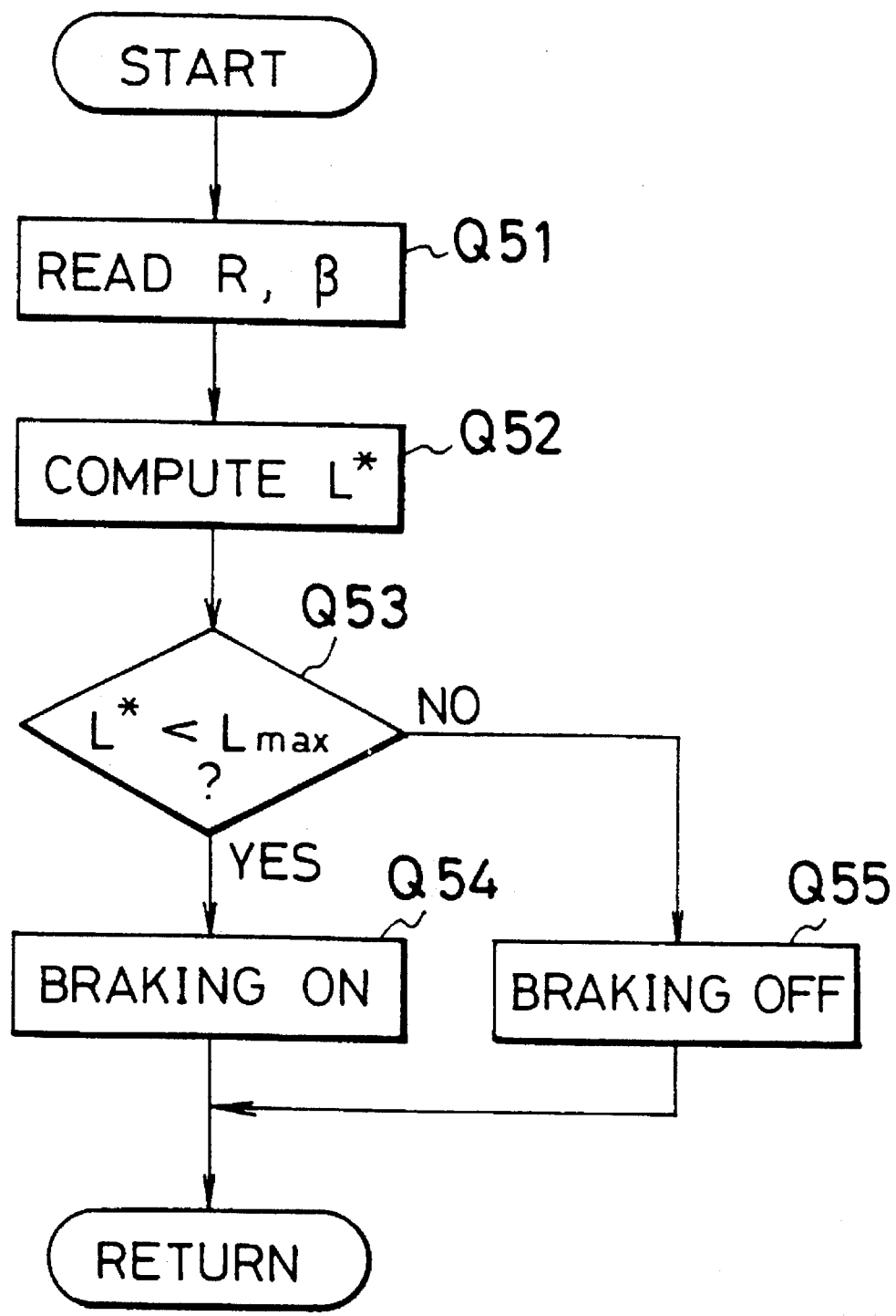
FIG. 14 is a flowchart showing the process for, for example, determining the region outside a detectable region to be detectable by the radar unit in the running way of the vehicle with the distinction means.

The distinction of the nearest obstacle by the distinction means 68 can be performed in accordance with the flowchart as shown in FIGS. 12 and 13. Further, a decision to determine if the running way of the vehicle exists outside the given region is made by the decision means 69 in accordance with the flowchart as shown in FIG. 14.

As shown in FIGS. 12 and 13, first, at step Q11, data of the radius R of curvature of the running way of the vehicle and the laterally slipping angle $\beta$ are entered from the running-way predicting means 67, followed by proceeding to step Q12 at which data is entered from the computation unit 63 of the radar unit 64. The data of the radar unit 64 is composed of obstacles data containing a total number of M obstacles, and the obstacles data further contains data of distances Li (i=1–M) between the body of the vehicle and the obstacle, data of a horizontal angle $\phi i$ of the obstacle relative to the central line of the radar unit 64 (nearly coinciding with the central line of the body of the vehicle), and data of no-echo counter Ci. The no-echo counter Ci represents the time required for scanning in one scanning direction a distance in the running way of the vehicle between one obstacle (i=n) and the obstacle (i=n–1) adjacent to the one obstacle located at the leading side in the scanning direction.

Thereafter, at step Q13, an initial value is set by setting a value ln to Lmax, a value tn to zero, and a value i to zero. The value ln represents the distance between the body of the vehicle and the nearest obstacle among the obstacles existing ahead in the running way of the vehicle, and the distance Lmax represents the maximally detectable distance to be detectable by the radar unit 64 in order to ensure the function of preventing a collision of the vehicle with the nearest obstacle by the automatic brake system.

After the initial values were set at step Q13, the program flow goes to step Q14 at which the value i is increased by one count, followed by proceeding to step Q15 at which it is decided to determine if the value i is equal to or smaller than M. When it is decided at step Q15 that the value i is equal to or smaller than M, then the program flow goes to step Q16 at which angles $\psi o$, $\psi min$, and $\psi max$ are computed by the following formulas:

$\psi o = (Li/2R) - \beta$ $\psi min = \psi o - (W/2Li)$ $\psi max = \psi o + (W/2Li)$ where R is the radius of curvature of the running way of the vehicle;

$\beta$ is the laterally slipping angle;

Li is the distance between the body of the vehicle and the obstacle (i=1–M); and W is the width of the running way B extending ahead in the running way of the vehicle.

Figure 15:
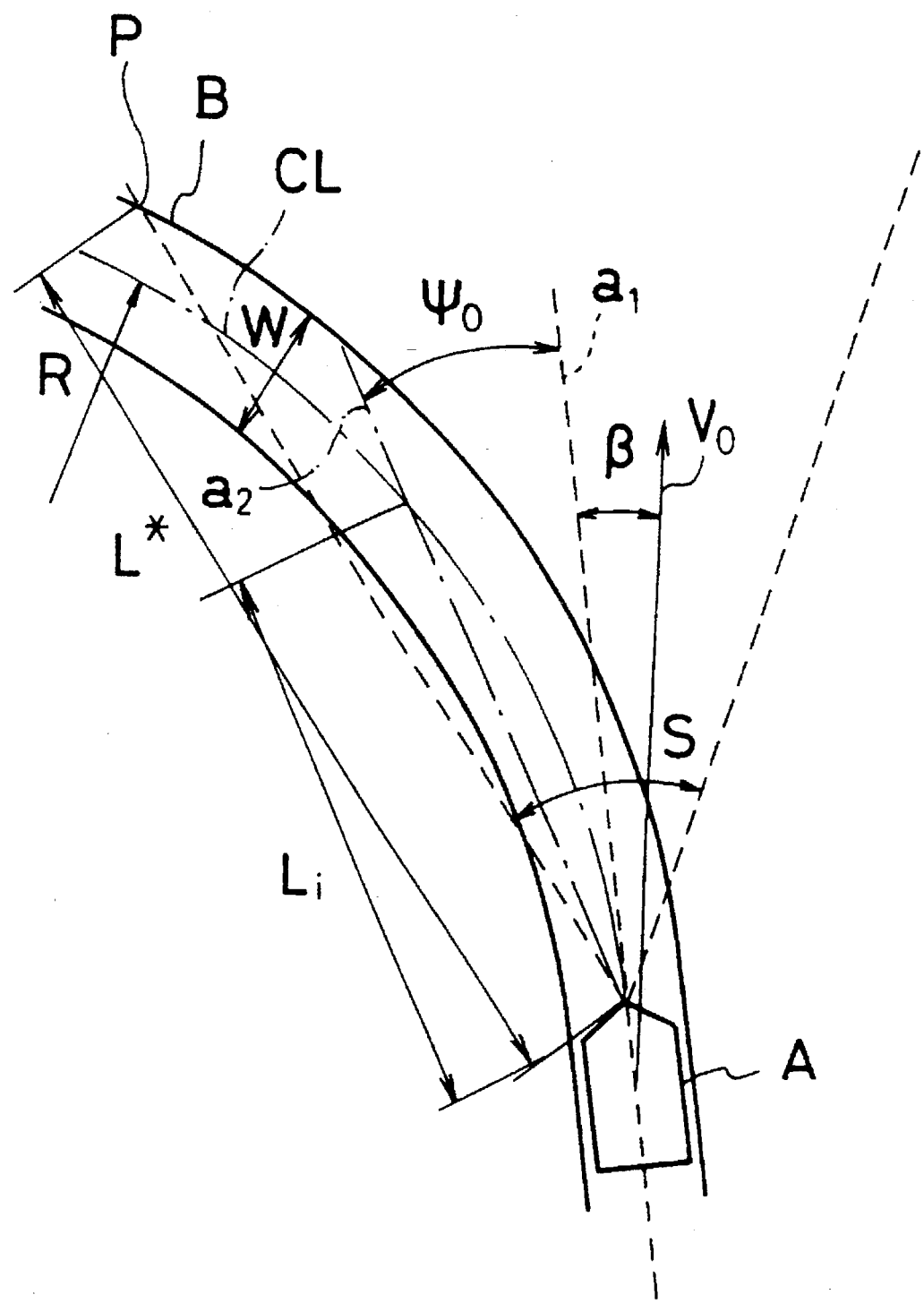
FIG. 15 is a schematic representation showing, for example, the relation of the running way of the vehicle with the detectable distance to be detectable by the radar unit.

As shown in FIG. 15, it can be noted that the angle $\psi o$ is the included angle of a straight line a2 connecting the body A of the vehicle with the central line CL of the running way B remote by the remote position Li from the top of the body A of the vehicle with respect to the central line a1 of the body thereof (i.e. the central line of the radar unit 64); and the angles $\psi min$ and $\psi max$ are the included angles of the respectively straight lines connecting the body A of the vehicle with the left-hand and right-hand side edges of the running way B remote by the remote position Li from the top of the body A of the vehicle with respect to the central line a1 of the body thereof (i.e. the central line of the radar unit 61). It is further to be noted that the clockwise direction is represented by the positive sign and that the counter-clockwise direction is represented by the negative sign.

Then, at step Q17, the no-echo counter Ci is added to a time t0, followed by proceeding to step Q18 at which it is decided to determine if the horizontal angle $\phi i$ of the obstacle exists between the angles $\psi min$ and $\psi max$, that is, if the obstacle exists on the running way B of the vehicle. Thereafter, at step Q19, it is further decided to determine if the distance Li between the obstacle and the body of the vehicle is smaller than the distance ln. When the decision at step Q19 gives the affirmative result, then the program flow goes to step Q20 at which the distance Li is set to the distance ln and the time t0 is set to tn, followed by returning the program flow to step Q14. On the other hand, when the decision at step Q18 or at step Q19 gives the negative result, then the program flow is returned to step Q14.

By repeating the processes at steps Q14–Q20, the nearest obstacle existing ahead in the running way B of the vehicle A can be distinguished from the total number of M obstacles monitored and detected by the radar unit 64, thereby setting the distance between the nearest obstacle and the body of the vehicle to the distance ln.

When the total number of M obstacles have all been checked, then the program flow goes to step Q21 at which the value obtained by subtracting the time tn from the time T is set to t0 (=T–tn). In the description as described hereinabove, the time T is the time required by the radar unit 64 for scanning one frame; the time tn is the time required by the radar unit 64 for scanning the nearest obstacle in scanning one frame from the time when the various factors have been substituted; and the time t0 is the time required thereby for finishing the scanning of one frame from the time at which the nearest obstacle has been detected. By adding the no-echo counter Ci to the time t0 until the nearest obstacle can be detected in scanning next one frame by the radar unit 64, there can be measured the time required for detecting the nearest obstacle twice in scanning two frames. At step Q34, this time is used for computing the relative speed V of the vehicle relative to the nearest obstacle.

Thereafter, at step Q22, it is decided to determine if the distance ln is being set to the detectable distance Lmax, that is, if the initial values have been set and they are not changed yet. When the decision at step Q22 gives the affirmative result, then the program flow goes to step Q23 at which the distance ln is set to zero, followed by proceeding to step Q31. On the other hand, when it is decided at step Q22 that the distance ln is smaller than the detectable distance Lmax, then the program flow is returned intact to step Q31.

At step Q31, it is decided to determine if the nearest obstacle exists ahead in the running way of the vehicle.

When the result of the decision at step Q31 indicates that the nearest obstacle exists ahead, then the program flow goes to step Q32 at which the count n is set to zero, followed by proceeding to step Q33 at which a variety of substitution is performed by setting lj+1 to ln, tj+1 to tj+1, and j to j+1. Then, at step Q34, the distance lo between the body of the vehicle located at the current time and the nearest obstacle is computed by interpolation such as the method of least square, and the relative speed V of the speed of the vehicle at the current time relative to the speed or position of the nearest obstacle is computed on the basis of the distance lo computed herein, followed by returning the program flow.

On the other hand, when the decision at step Q31 gives the negative result, then the program flow goes to step Q35 at which the count n is increased by count one, followed by proceeding to step Q36 at which it is decided to determine if the count n is smaller than the given number of times, N. When it is decided at step Q36 that the count n is smaller than the given times, N, then the program flow goes to step Q37 at which the distance lo between the body of the vehicle located at the current time and the nearest obstacle is computed on the basis of the previous data by extrapolation, and the relative speed V of the body of the vehicle at the current time relative to the nearest obstacle is computed on the basis of the distance lo computed herein, followed by returning the program flow.

Furthermore, when it is decided at step Q36 that the count n is equal to or larger than the given times N, that is, that the nearest obstacle does not exist ahead any more and a given time has elapsed thereafter, then the program flow goes to step Q38 at which the count n is set to zero, followed by proceeding to step Q39 at which lj and tj are set each to zero. Then, at step Q40, the distance lo between the body of the vehicle in the current position and the nearest obstacle and the relative speed V are set each to zero, followed by returning the program flow.

In addition, as shown in FIG. 14, the radius of curvature, R, and the laterally slipping angle β, computed by the running-way predicting means 67, are read at step Q51. Then, at step Q52, a distance L* is computed by the following formulas:

$$L^* = 2R \times \sin(S/2 + \beta) \text{ when } \theta H > 0; \text{ and}$$

$$L^* = 2R \times \sin(S/2 - \beta) \text{ when } \theta H < 0.$$

It can be noted herein that, as shown in FIG. 15, the distance L* represents the distance between the top of the body of the vehicle A and the point P at which the running way B of the vehicle intersects with the boundary line of the detectable distance of the radar unit 64 (extending at the inclined angle S). In this description, the steered angle θH is indicated by the positive sign when looked to the left in the advance direction of the vehicle (i.e. when steered in the counterclockwise direction in FIG. 15).

After the computation of the distance L*, the program flow goes to step Q53 at which it is decided to determine if the distance L* is shorter than the maximally detectable distance Lmax detectable by the radar unit 64. This decision is made to eventually determine if the running way of the vehicle A extends to a position outside the detectable region S to be detectable by the radar unit 64. When it is decided at step Q53 that the distance L* is shorter than the detectable distance Lmax, then the program flow goes to step Q54 at which the automatic brake system is operated to perform the automatic braking, followed by returning the program flow. On the other hand, when the decision at step Q53 gives the negative result, then the automatic braking is released at step Q55, followed by returning the program flow.

Hence, in instances where the running way B to be predicted, for example, when the vehicle is cornered at a steep angle, extends outside the detectable region S to be detectable by the radar unit 64, the automatic brake system is operated under control of the control unit 81 in response to the signals from the distinction means 69. The operation of the automatic brake system can decelerate the speed of the vehicle so as to allow the running way B to be detectable within the detectable range S to be detectable by the radar unit 64, thereby ensuring safety in driving the vehicle.

It should be understood as a matter of course that the above description of the present invention is not made to restrict the present invention in any respect to the embodiments as described hereinabove and that the present invention contains any modifications and variations that do not depart from the spirit and scope of the present invention.

In the description of the embodiments of the safety system according to the present invention as made hereinabove, it is described that the detectable distance Lmax in the running way of the vehicle is reduced by the obstacle detecting means 36 when the lens of the radar head unit is stained or soiled or when rain is falling or when the running way is curved and there is a blind curve ahead in the running way of the vehicle. It can apparently be understood that any other cause of reducing the detectable distance Lmax in the running way of the vehicle can likewise be applied to the present invention without any difficulty and these cases should also be understood as an embodiment of the safety system according to the present invention.

Further, in the description of the embodiments of the safety system according to the present invention as described hereinabove, the automatic brake system having the buzzer or any unit producing an alarm sound is taken as an example as the means for avoiding the collision of the body of the vehicle with the obstacle existing ahead when it is decided that there is the risk that the vehicle collides with the obstacle. It should be noted as a matter of course, however, that an automatically steering system or any unit merely producing an alarm sound or the like can also be applied likewise, as an example, to the means for avoiding the collision with the obstacle existing ahead when there is the risk that the vehicle collides with the obstacle.

In addition, the description of the embodiments of the safety system according to the present invention as described hereinabove is directed to the configuration in which the body of the vehicle is equipped with the obstacle detecting means together with the automatic brake system and in which, when it is decided by the decision means 69 of the obstacle detecting means that the running way in which the vehicle is running extends toward a region outside the detectable region S detectable by the radar unit 64, the automatic brake system is operated to decelerate the speed of the vehicle so as for the running way B to converge within the detectable region S. It can be understood, however, that the safety system according to the present invention may have an alarm unit, in place of the automatic brake system, which is so arranged as to produce an alarm sound or the like when it is decided by the decision means 69 of the obstacle detecting means that the running way of the vehicle extends toward a region outside the detectable region S detectable by the radar unit 64. Further, a different type of conventional safety units can be used for the safety system according to the present invention.

Furthermore, the embodiments of the safety system according to the present invention as described hereinabove are directed to the configuration in which, while the obstacles existing ahead are being monitored with the radar unit in a horizontal direction at a relatively wide angle, the obstacles existing ahead in the running way of the vehicle are sorted out from the obstacles detected by the radar unit and the detection of the obstacles with the radar unit can be restricted to the region along the running way of the vehicle. It should further be noted, however, that the present invention is directed to the safety system in which a radar unit capable of detecting the running way of the vehicle in a relatively narrow angle range is disposed so as to be pivotable in a horizontal direction and the detectable area of the radar unit can be limited to the region along the running way of the vehicle by arranging the radar unit so as for its detecting area to be directed toward the forward direction in which the vehicle is running. In this case, too, a safety unit may be combined with the safety system as described hereinabove in order to produce an alarm sound or the like when the running way of the vehicle expands outside the detectable region to be detectable by the radar unit due to the pivotal movement of the radar unit at the maximal angle.

In addition, the deceleration can be made by braking the engine, in place of braking the wheels. In this case, the vehicle having an automatic transmission can acquire a large amount of engine-braking force by down-shifting.

Furthermore, it can be understood that the alarm unit may be operated for producing an alarm sound or turning light on and off (corresponding to the process at step S4 in FIG. 3 prior to or concurrently with the process to be made at step S27 in FIG. 8, at step S36 in FIG. 10, or at step Q54 in FIG. 14. The alarm unit can be released when passage over step S28 in FIG. 8, step S37 in FIG. 10, and step Q55 in FIG. 14, respectively.

The present invention is not intended in any manner to be limited to the embodiments as described hereinabove, and it is to be understood that any variations or modifications made so as not to deviate from the basic concept of the present invention are interpreted as being encompassed within the spirit of the present invention.

What is claimed is:

1. A running-safety system for an automotive vehicle, comprising:

obstacle detecting means for detecting an obstacle in a detectable region existing ahead of the automotive vehicle in a running way along which the vehicle is running;

detection means for detecting a variation from a normal state of the detectable region; and safety means for taking an action to make running of the vehicle safe when the detection means detects a variation of the detectable region from the normal state.

2. A running-safety system as claimed in claim 1, wherein:

said detection means detects a decrease in the detectable region of the running way; and said safety means is operated when said detectable region is decreased.

3. A running-safety system as claimed in claim 2, wherein said detection means detects an opacity of said obstacle detecting means to thereby detect a decrease in the detectable region of the running way when said obstacle detecting means is stained or soiled.

4. A running-safety system as claimed in claim 2, wherein said detection means detects rain to thereby detect a decrease in the detectable region of the running way when the rain is detected.

5. A running-safety system as claimed in claim 4, wherein a rate at which said safety means is altered to a safe side is set to become greater as a pressure of rain detected by said detection means becomes higher.

6. A running-safety system as claimed in claim 2, wherein said detection means detects a blind curved corner existing ahead in the running way to thereby detect a decrease in the detectable region.

7. A running-safety system as claimed in claim 2, wherein a rate at which said safety means is altered to a safe side becomes greater as a rate at which the detectable region of the running way to be detectable by said obstacle detecting means becomes greater.

8. A running-safety system as claimed in claim 1, wherein:

said detection means detects a decrease in the detectable distance of the running way; and said safety means is operated when said detectable distance is decreased.

9. A running-safety system as claimed in claim 1, wherein:

said detection means detects a decrease in the detectable region of the running way in left and right directions; and said safety means is operated when said detectable region in the left and right directions is decreased.

10. A running-safety system as claimed in claim 1, wherein said safety means comprises an alarm unit disposed within a cabin of the vehicle for producing an alarm.

11. A running-safety system as claimed in claim 1, wherein said safety means alters a running status of the vehicle to a safe side.

12. A running-safety system as claimed in claim 1, wherein said safety means decelerates the vehicle.

13. A running-safety system as claimed in claim 12, wherein said safety means comprises an automatic brake unit for automatically applying braking force to each wheel.

14. A running-safety system as claimed in claim 1, wherein:

said safety means comprises an alarm unit disposed within a cabin of the vehicle for producing an alarm and a running-status altering means for altering a running status of the vehicle to a safe side.

15. A running-safety system as claimed in claim 14, wherein:

said alarm unit comprises at least one of an alarm lamp and an alarm buzzer; and said running-status altering means comprises an automatic brake unit for automatically applying a braking force to each wheel of the vehicle.

16. A running-safety system as claimed in claim 1, wherein said obstacle detecting means comprises at least a radar unit of an ultrasonic type or a radar unit of a laser type.

17. A running-safety system as claimed in claim 1, further comprising:

decision means for making a decision in accordance with output from said obstacle detecting means to determine if there is a risk that the vehicle will collide with the obstacle existing ahead in the running way; and collision-avoiding means for avoiding a collision with the obstacle when it is decided by said decision means that there is the risk that the vehicle will collide with the obstacle;

wherein said detection means detects a decrease in a detectable distance of the running way to be detectable by said obstacle detecting means; and wherein said safety means alters a decision logic for deciding the risk of collision of the vehicle with the obstacle to a safe side, when said detection means detects a decrease in said detectable distance.

18. A running-safety system as claimed in claim 17, wherein:

said decision means decides the risk of collision of the vehicle with the obstacle when a distance of the running way between the vehicle and the obstacle, obtained on the basis of output from said obstacle detecting means, becomes equal to or shorter than a predetermined distance; and said safety means alters said predetermined distance to become shorter than its original distance.

19. A running-safety system as claimed in claim 18, wherein:

said predetermined distance comprises a first predetermined distance and a second predetermined distance that is set to become shorter than said first predetermined distance;

said collision-avoiding means comprises first collision-avoiding means set to correspond to said first predetermined distance and a second collision-avoiding means set to correspond to said second predetermined distance;

said first collision-avoiding means is operated when it is decided by said decision means that a distance of the running way between the vehicle and the obstacle becomes equal to or shorter than said first predetermined distance;

said second collision-avoiding means is operated when it is decided by said decision means that the distance of the running way between the vehicle and the obstacle becomes equal to or shorter than said second predetermined distance; and said safety means makes said first predetermined distance and said second predetermined distance shorter than each of their original distances.

20. A running-safety system as claimed in claim 19, wherein:

said first collision-avoiding means comprises an alarm unit for producing an alarm for an operator; and said second collision-avoiding means comprises an automatic brake unit for decelerating a speed of the vehicle.

21. A running-safety system as claimed in claim 19, wherein said first predetermined distance and said second predetermined distance are each set to become shorter as the detectable distance of the running way to be detectable by said obstacle detecting means becomes shorter.

22. A running-safety system as claimed in claim 1, further comprising:

decision means for making a decision that there is a risk that the vehicle will collide with the obstacle existing ahead in the running way, when a distance of the running way between the body of the vehicle and the obstacle, obtained on the basis of output from said obstacle detecting means, becomes equal to or shorter than a predetermined distance; and collision-avoiding means for avoiding a collision with the obstacle when it is decided by said decision means that there is the risk that the vehicle will collide with the obstacle;

wherein said detection means detects a decrease in the detectable distance to be detectable by said obstacle detecting means; and wherein said safety means operates said collision-avoiding means prior to the decision made by said decision means when the decrease in the detectable distance is detected by said detection means.

23. A running-safety system as claimed in claim 22, wherein:

said collision-avoiding means contains an automatic brake unit for decelerating a speed of the vehicle; and said safety means operates said automatic brake unit during a period of time when a maximally detectable distance detectable by said obstacle detecting means becomes longer than said predetermined distance after the detectable distance has been reduced.

24. A running-safety system as claimed in claim 23, further comprising an alarm unit for producing an alarm when said automatic brake unit is operated by said safety means.

25. A running-safety system as claimed in claim 24, wherein:

said collision-avoiding means has a first alarm unit for producing an alarm in addition to said automatic brake unit; and said alarm unit to be operated when said automatic brake unit is operated by said safety means comprises a second alarm unit disposed discretely from said first alarm unit.

26. A running-safety system as claimed in claim 25, wherein:

one of said first alarm unit and said second alarm unit is an alarm lamp; and the other of said first alarm unit and said second alarm unit is an alarm buzzer.

27. A running-safety system as claimed in claim 1, further comprising:

decision means for deciding if a distance of the running way between the body of the vehicle and the obstacle, obtained on the basis of output from said obstacle detecting means, is shorter than a predetermined distance; and collision-avoiding means for avoiding a collision with the obstacle when it is decided by said decision means that the distance between the body of the vehicle and the obstacle, is shorter than said predetermined distance;

wherein said detection means detects a decrease in the detectable distance of the running way to be detectable by said obstacle detecting means; and wherein said safety means comprises an automatic brake unit for decelerating a speed of the vehicle and operates said automatic brake unit when the decrease in the detectable distance to be detectable by said obstacle detecting means is detected by said detection means.

28. A running-safety system as claimed in claim 27, wherein:

said collision-avoiding means contains said automatic brake unit; and said automatic brake unit as said safety means is operated prior to the decision to be made by said decision means when the decrease in the detectable distance to be detectable by said obstacle detecting means is detected by said detection means.

29. A running-safety system as claimed in claim 25, wherein said predetermined distance becomes longer as a relative speed of the vehicle relative to the obstacle in a direction in which the vehicle approaches the obstacle becomes faster.

30. A running-safety system as claimed in claim 29, wherein:

said predetermined distance is set as a first predetermined distance and a second predetermined distance, said second predetermined distance being set so as to become longer as the relative speed of the vehicle relative to the obstacle in a direction in which the vehicle approaches the obstacle becomes faster and to be shorter than said first predetermined distance;

said collision-avoiding means contains an alarm unit in addition to said automatic brake unit, said alarm unit being operated when it is decided by said detection means that a distance of the running way between the vehicle and the obstacle is equal to or shorter than said first predetermined distance, and said automatic brake unit being operated when it is decided by said detection means that the distance between the vehicle and the obstacle is equal to or shorter than said second predetermined distance; and said safety means decelerates a speed of the vehicle by operating said automatic brake unit prior to the decision by said detection means when a decrease in the detectable distance to be detectable by said obstacle detecting means is detected by said detection means.

31. A running-safety system as claimed in claim 30, wherein a period of time during which said automatic brake unit is operated by said safety means is set to be a period of time during which a maximally detectable distance to be detectable by said obstacle detecting means in a state in which the detectable distance to be detectable by said obstacle detecting means is decreased becomes longer than said first predetermined distance.

32. A running-safety system as claimed in claim 31, wherein said first predetermined distance and said second predetermined distance are each set to become longer as the speed of the vehicle becomes faster.

33. A running-safety system as claimed in claim 1, wherein said detection means detects an extension of the running way in left and right directions outside a detectable range of the running way to be detectable by said obstacle detecting means.

34. A running-safety system as claimed in claim 33, wherein said safety means comprises an alarm unit for producing an alarm for an operator.

35. A running-safety system as claimed in claim 33, wherein said safety means comprises an automatic brake unit for decelerating the speed of the vehicle.

36. A running-safety system as claimed in claim 33, wherein said detection means assumes the running way of the vehicle on the basis of a steered angle of a steering wheel and the speed of the vehicle.

37. A running-safety system as claimed in claim 33, wherein said detection means detects a cornered road existing ahead in the course of the running way of the vehicle beyond a maximally detectable distance thereof to be detectable by said obstacle detecting means, to thereby determine that the running way of the vehicle extends in left and right directions outside a detectable region thereof to be detectable by said obstacle detecting means.

38. A running-safety system as claimed in claim 33, wherein said detection means detects cornering of the vehicle at a steep angle and further detects an extension of the running way of the vehicle in left and right directions outside the detectable region thereof to be detectable by said obstacle detecting means at the time of the cornering of the vehicle at the steep angle.

39. A running-safety system as claimed in claim 33, wherein:

said detection means detects an extension of the running way of the vehicle in the left and right directions outside the detectable region of the running way to be detectable by said obstacle detecting means when the maximally detectable distance to be detectable by said obstacle detecting means is shorter than a predetermined distance; and said predetermined distance is determined on the basis of an angle at which obstacle detecting means detects the obstacle existing ahead in left and right directions of the running way, a radius of curvature of the running way along which the vehicle is running, a laterally slipping angle of the body of the vehicle, and a direction in which a steering wheel is steered.

40. A running-safety system as claimed in claim 39, wherein said radius of curvature of the running way and said laterally slipping angle of the body of the vehicle are determined each on the basis of the steered angle of the steering wheel and the speed of the vehicle.

41. A running-safety system for an automotive vehicle, comprising:

obstacle detecting means for detecting an obstacle existing ahead in a running way along which the vehicle is running;

detection means for detecting a decrease in performance of detection of the obstacle by said obstacle detecting means; and safety means for taking an action to make running of the vehicle safe when said detection means detects the decrease in the performance of detection of the obstacle by said obstacle detecting means.

42. A running-safety system as claimed in claim 41, wherein said detection means detects an opacity of said obstacle detecting means to thereby detect a decrease in the detectable region of the running way when said obstacle detecting means is stained or soiled.

43. A running-safety system as claimed in claim 41, wherein said detection means detects rain to thereby detect a decrease in the detectable region of the running way when the rain is detected.

44. A running-safety system as claimed in claim 43, wherein a rate at which said safety means is altered to a safe side is set to become greater as a pressure of rain detected by said detection means becomes higher.

45. A running-safety system as claimed in claim 41, wherein said detection means detects a blind curved corner existing ahead in the running way to thereby detect a decrease in the detectable region.

46. A running-safety system as claimed in claim 41, wherein a rate at which said safety means is altered to a safe side becomes greater as a rate at which the detectable region of the running way to be detectable by said obstacle detecting means becomes greater.

47. A running-safety system for an automotive vehicle, comprising:

obstacle detecting means for detecting an obstacle in a detectable region existing ahead of the automotive vehicle in a running way along which the vehicle is running;

direction detecting means for detecting a direction in which the vehicle is running;

detection means for detecting a variation of the detectable region; and safety means for taking an action to make running of the vehicle safe when the detectable region does not lie in the direction in which the vehicle is running.

48. A running-safety system as claimed in claim 47, wherein said safety means comprises an alarm unit for producing an alarm for an operator.

49. A running-safety system as claimed in claim 47, wherein said safety means comprises an automatic brake unit for decelerating the speed of the vehicle.

50. A running-safety system as claimed in claim 47, wherein said detection means assumes the running way of the vehicle on the basis of a steered angle of a steering wheel and the speed of the vehicle.

51. A running-safety system as claimed in claim 47, wherein said detection means detects a cornered road existing ahead in the course of the running way of the vehicle beyond a maximally detectable distance thereof to be detectable by said obstacle detecting means, to thereby determine that the running way of the vehicle extends in left and right directions outside a detectable region thereof to be detectable by said obstacle detecting means.

52. A running-safety system as claimed in claim 47, wherein said detection means detects cornering of the vehicle at a steep angle and further detects an extension of the running way of the vehicle in left and right directions outside the detectable region thereof to be detectable by said obstacle detecting means at the time of the cornering of the vehicle at the steep angle.

53. A running-safety system as claimed in claim 47, wherein:

said detection means detects an extension of the running way of the vehicle in the left and right directions outside the detectable region of the running way to be detectable by said obstacle detecting means when the maximally detectable distance to be detectable by said obstacle detecting means is shorter than a predetermined distance; and said predetermined distance is determined on the basis of an angle at which obstacle detecting means detects the obstacle existing ahead in left and right directions of the running way, a radius of curvature of the running way along which the vehicle is running, a laterally slipping angle of the body of the vehicle, and a direction in which a steering wheel is steered.

54. A running-safety system as claimed in claim 53, wherein said radius of curvature of the running way and said laterally slipping angle of the body of the vehicle are determined each on the basis of the steered angle of the steering wheel and the speed of the vehicle.

* * * * *